US009634521B2

United States Patent
Sako et al.

(10) Patent No.: US 9,634,521 B2
(45) Date of Patent: Apr. 25, 2017

(54) POWER CONTROL APPARATUS, POWER SUPPLY CONTROL METHOD, AND POWER SUPPLY CONTROL PROGRAM

(71) Applicant: SONY CORPORATION, Tokyo (JP)

(72) Inventors: Yoichiro Sako, Tokyo (JP); Mitsuru Takehara, Tokyo (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 13/891,488

(22) Filed: May 10, 2013

(65) Prior Publication Data
US 2013/0313902 A1 Nov. 28, 2013

(30) Foreign Application Priority Data

May 25, 2012 (JP) ................................. 2012-119232

(51) Int. Cl.
*H02J 9/06* (2006.01)
*H02J 9/00* (2006.01)
(52) U.S. Cl.
CPC .............. *H02J 9/005* (2013.01); *H02J 9/06* (2013.01); *Y02B 10/72* (2013.01); *Y10T 307/344* (2015.04); *Y10T 307/625* (2015.04)
(58) Field of Classification Search
CPC .......... H02J 9/06; H02J 9/005; Y10T 307/625
(Continued)

(56) References Cited

U.S. PATENT DOCUMENTS 4,611,289 A * 9/1986 Coppola ................... G06F 1/30
  713/300
5,315,161 A * 5/1994 Robinson .................. G06F 1/30
  307/66

(Continued)

FOREIGN PATENT DOCUMENTS

CN        1518373 A      8/2004
JP        2001-258178    9/2001

(Continued)

OTHER PUBLICATIONS

Feb. 26, 2016, Chinese Office Action for related CN Application No. 201310184670.9.

(Continued)

*Primary Examiner* — Fritz M Fleming
(74) *Attorney, Agent, or Firm* — Paratus Law Group, PLLC

(57) ABSTRACT

There is provided an apparatus including a power control apparatus for supplying power from an external power source or power from private power supply equipment to a plurality of electrical appliances, the power control apparatus including a power failure detection device for detecting an interruption of power supply from the external power source and for measuring a power supply interruption duration, a storage device for storing power supply information regarding power supply from the private power supply equipment to the electrical appliances, and a power supply control device for controlling the power supply from the private power supply equipment to the electrical appliances based on the power supply information stored in the storage device when the power supply interruption duration measured by the power failure detection device is in excess of a predetermined time period.

20 Claims, 7 Drawing Sheets

(58) Field of Classification Search
USPC .......................................................... 307/66
See application file for complete search history.

(56) References Cited

U.S. PATENT DOCUMENTS

| | | | | |
|---|---|---|---|---|
| 5,319,571 A | * | 6/1994 | Langer | ...................... G06F 1/26 |
| | | | | 713/300 |
| 2011/0148360 A1 | * | 6/2011 | Lee | ........................... H02J 7/35 |
| | | | | 307/66 |

FOREIGN PATENT DOCUMENTS

| | | |
|---|---|---|
| JP | 2003-092844 | 3/2003 |
| JP | 2004-328960 | 11/2004 |
| JP | 2008-011612 | 1/2008 |
| JP | 2009-159687 | 7/2009 |
| JP | 2010-259201 | 11/2010 |
| JP | 2012-095424 | 5/2012 |
| WO | WO2011/142330 A1 | 11/2011 |

OTHER PUBLICATIONS

Nov. 24, 2015, Japanese Office Action for related JP Application No. 2012-119232.
May 24, 2016, Japanese Office Action for related JP Application No. 2012-119232.
Sep. 13, 2016, JP communication issued for related JP application No. 2012-119232.

* cited by examiner

POWER CONTROL APPARATUS, POWER SUPPLY CONTROL METHOD, AND POWER SUPPLY CONTROL PROGRAM

BACKGROUND

The present disclosure relates to a power control apparatus, a power supply control method, and a power supply control program.

Various techniques have been known for causing the power supply to electrical appliances not to be stopped even when the power supply from an external power source is interrupted. For example, Japanese Patent Application Laid-Open Publication No. 2004-328960 discloses an uninterruptible power supply apparatus including a storage battery which can supply electric power to a plurality of electrical appliances and a demand control device provided between the storage battery and the plurality of electrical appliances. Here, the demand control device decides on the priority for electric power which should be supplied to the plurality of electrical appliances according to their importance. The demand control device, in case of a power failure, restricts the supply of power to the electrical appliances in the order of the electrical appliances whose priorities are lower according to the state of the remaining amount of charge of the storage battery.

Further, Japanese Patent Application Laid-Open Publication No. 2003-092844 discloses a private power supply control system including a private power generating device or a private power accumulating device. Here, when commercial power supply is interrupted, electric power is intended to be supplied from the private power generating device or the private power accumulating device to electrical appliances in a customer through a power control device. A function that transmits information concerning an expected power recovery time to a customer through a communication line at the time of the interruption of commercial power supply is provided to a commercial power supply company, and a function that receives the information from the power company is provided to a power control device of the customer. With this configuration, when a commercial power supply is interrupted, the power control apparatus can select an appropriate electrical appliance according to the received expected power recovery time and can supply electric power from private power generating device or the private power accumulating device to the selected electrical appliance.

SUMMARY

However, in the Japanese Patent Application Laid-Open Publication No. 2004-328960, none of the techniques has been mentioned where the power supply to electrical appliances is controlled depending on the length of power failure duration. Further, in the Japanese Patent Application Laid-Open Publication No, 2003-092844, when a commercial power supply is interrupted, it would be necessary to provide the function of receiving information concerning an expected power recovery time to the power control apparatus of a customer through a communication line, this in turn leads to increased cost of the private power supply control system. In addition, it information concerning an expected power recovery time is no available, it is not possible to select electrical appliances. Furthermore, for example, it would be not possible to take an appropriate action when an ampere breaker has dropped in homes, factories, offices, etc.

According to an embodiment of the present disclosure, there is provided a power control apparatus, a power supply control method, and a power supply control program, which can control the power supply to electrical appliances according to the length of power failure duration without depending on failure information from an external.

According to an embodiment of the present disclosure, there is provided a power control apparatus for supplying power from an external power source or power from private power supply equipment to a plurality of electrical appliances, the power control apparatus including a power failure detection device for detecting an interruption of power supply from the external power source and for measuring a power supply interruption duration, a storage device for storing power supply information regarding power supply from the private power supply equipment to the electrical appliances, and a power supply control device for controlling the power supply from the private power supply equipment to the electrical appliances based on the power supply information stored in the storage device when the power supply interruption duration measured by the power failure detection device is in excess of a predetermined time period. In addition, the phrase "to control the power supply to electrical appliances" is equivalent to the activity of controlling the operation of electrical appliance based on the power supply. The same is true in the following descriptions unless otherwise specified.

According to an embodiment of the present disclosure, there is provided a power control apparatus for supplying power from a first external power source or power from a second external power source to a plurality of electrical appliances, the power control apparatus including a power failure detection device for detecting an interruption of power supply from the first external power source and for measuring a power supply interruption duration, a storage device for storing power supply information regarding power supply from the second external power source to the electrical appliances, and a power supply control device for controlling the power supply from the second external power source to the electrical appliances based on the power supply information stored in the storage device when the power supply interruption duration measured by the power failure detection device is in excess of a predetermined time period.

According to an embodiment of the present disclosure, there is provided a power supply control method of controlling power supply from an external power source or power supply from private power supply equipment to a plurality of electrical appliances, the method including measuring a power supply interruption duration after detecting an interruption of the power supply from the external power source, and controlling the power supply from the private power supply equipment to the electrical appliances based on power supply information regarding the power supply from the private power supply equipment to the electrical appliances when the power supply interruption duration is in excess of a predetermined time period.

According to an embodiment of the present disclosure, there is provided a power supply control method of controlling power supply from a first external power source or power supply from a second external power source to a plurality of electrical appliances, the method including measuring a power supply interruption duration after detecting an interruption of the power supply from the first external power source, and controlling the power supply from the second external power source to the electrical appliances based on power supply information regarding the power supply from the second external power source to the electrical appliances when the power supply interruption duration measured by a power failure detection device is in excess of a predetermined time period.

According to an embodiment of the present disclosure, there is provided a power supply control program for controlling power supply from an external power source or power supply from private power supply equipment to a plurality of electrical appliances, the program performs an operation including measuring a power supply interruption duration after detecting an interruption of the power supply from the external power source, and controlling the power supply from the private power supply equipment to the electrical appliances based on power supply information regarding the power supply from the private power supply equipment to the electrical appliances when the power supply interruption duration is in excess of a predetermined time period.

According to an embodiment of the present disclosure, there is provided a power supply control program for controlling power supply from a first external power source or power supply from a second power source to a plurality of electrical appliances, the program performs an operation including measuring a power supply interruption duration after detecting an interruption of the power supply from the first external power source, and controlling the power supply from the second external power source to the electrical appliances based on power supply information regarding the power supply from the second external power source to the electrical appliances when the power supply interruption duration measured by a power failure detection device is in excess of a predetermined time period.

The power control apparatus according to the first or second embodiment of the present disclosure includes the power failure detection device, the storage device, and the power supply control device. When the power supply interruption duration measured by the power failure detection device is in excess of a predetermined time period, the power supply from the private power supply equipment or the second external power source to the electrical appliance is controlled based on the power supply information stored in the storage device. Further, in the power supply control method or power supply control program according to the first or second embodiment of the present disclosure, the power supply interruption duration is measured. When the power supply interruption duration measured by the power failure detection device is in excess of a predetermined time period, the power supply from the private power supply equipment or the second external power source to the electrical appliance is controlled based on the power supply information regarding the power supply from the external power source or the second external power source to the electrical appliance. Therefore, it is possible to appropriately control the power supply from the private power supply equipment or the second external power source to the electrical appliance, for example, according to the length of power failure duration without depending on information from the external power source or the first external power source.

DETAILED DESCRIPTION OF THE EMBODIMENT(S)

Figure 1:
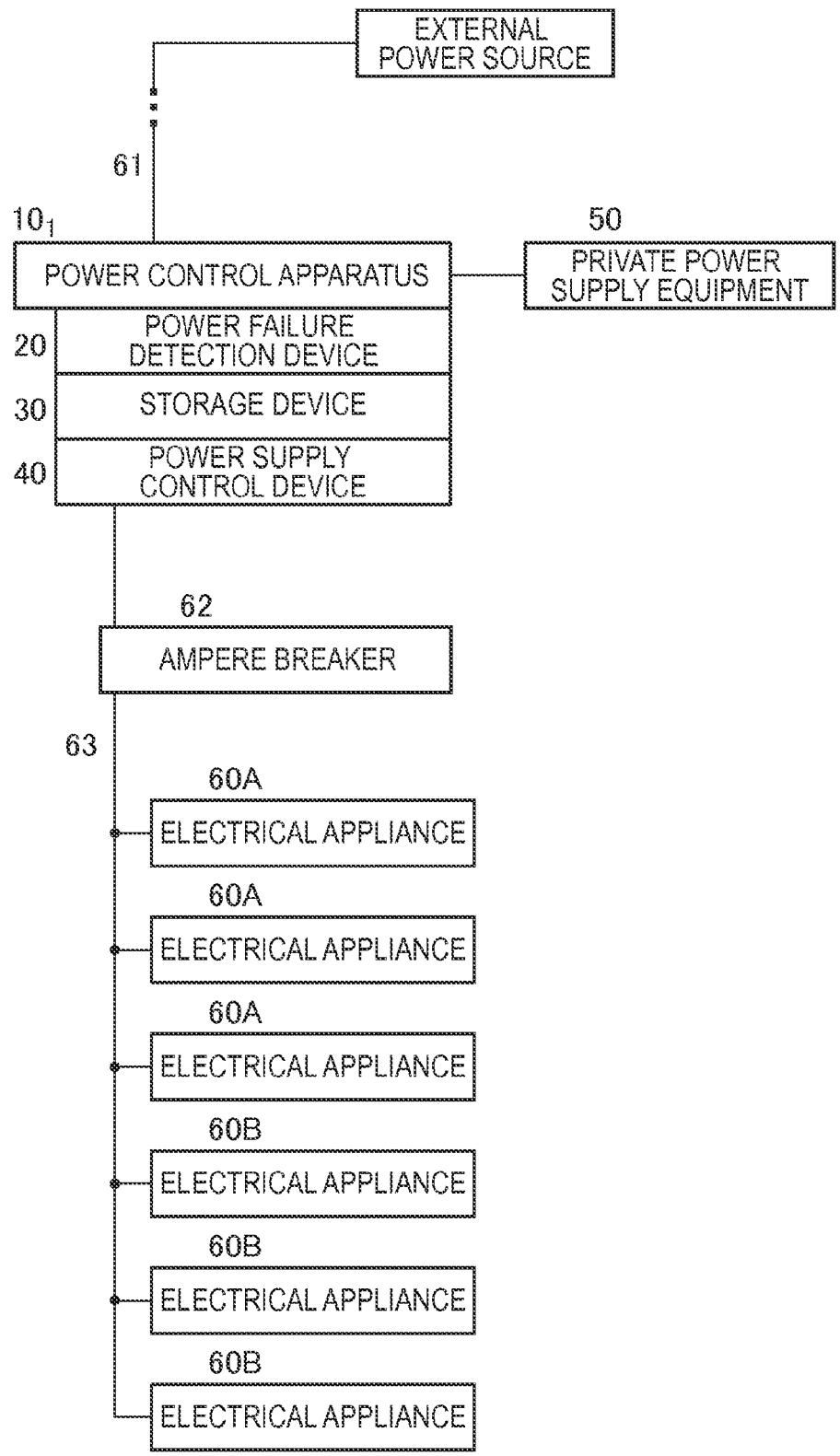
FIG. 1 is a conceptual diagram illustrating a power control apparatus and electrical appliances according to Example 1.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

However, the present disclosure is not limited to the embodiments described herein, and various numeric values and materials in the embodiments are shown for illustrative purposes. The description will be made in the following order.

1. Overview description of power control apparatus, power supply control method, and power supply control program according to first and second embodiments of present disclosure 2. Example 1 (power control apparatus according to first embodiment of present disclosure)

3. Example 2 (modified example of Example 1)

4. Example 3 (another modified example of Example 1)

5. Example 4 (modified example of any one of Examples 1 to 3; first power control apparatus A)

6. Example 5 (another modified example of Examples 1 to 3; first power control apparatus B)

7. Example 6 (still another modified example of Example 1 to 3; first power control apparatus C)

8. Example 7 (modified example of Examples 1 to 6; power control apparatus-A of present disclosure)

9. Example 8 (another modified example of Examples 1 to 6; power control apparatus-B of present disclosure)

10. Example 9 (modified example of Example 8)

11. Example 10 (modified example of Example 9)

12. Example 11 (modified example of Examples 1 to 11)

13. Example 12 (power control apparatus according to second embodiment of present disclosure), and others

[Overview Description of Power Control Apparatus, Power Supply Control Method, and Power Supply Control Program According to First and Second Embodiments of Present Disclosure]

In the following description, in a case where a power control apparatus according to the first embodiment of the present disclosure and a power control apparatus according to the second embodiment are explained together, the power control apparatus according to the first embodiment of the present disclosure and the power control apparatus according to the second embodiment may be collectively referred to as "power control apparatus according to embodiments of present disclosure". In addition, a phrase "external power source" as used in the power control apparatus according to the first embodiment of the present disclosure and a phrase "first external power source" as used in the power control apparatus according to the second embodiment may be collectively referred to as "external power source or the like". In addition, a phrase "power from external power source" as used in the power control apparatus according to the first embodiment of the present disclosure and a phrase "power from first external power source" as used in the power control apparatus according to the second embodiment may be collectively referred to as "power from external power source or the like". Furthermore, a phrase "power from private power supply equipment" as used in the power control apparatus according to the first embodiment of the present disclosure and a phrase "power from second external power source" as used in the power control apparatus according to the second embodiment may be collectively referred to as "power from private power supply equipment or the like". The phrase "amount of power supply from private power supply equipment" as used in the power control apparatus according to the first embodiment of the present disclosure and a phrase "amount of power supply from second external power source" as used in the power control apparatus according to the second embodiment may be collectively referred to as "amount of the power supply from private power supply equipment or the like".

In the power control apparatus according to embodiments of present disclosure, the power supply from the external power source or the like can be switched into the power supply from the private power supply equipment based on detection of an interruption of the power supply from the external source by the power failure detection device.

In the power control apparatus according to embodiments of present disclosure having the above-described preferred forms, the power supply information may include information regarding an electrical appliance which is not supplied with power from the private power supply equipment when the power failure detection device detects an interruption of the power supply from the external power source or the like. When the power failure detection device detects an interruption of the power supply from the external power source or the like, the power supply control device can control the power supply to an electrical appliance based on the power supply information. In addition, the power control apparatus having such a configuration may be sometimes referred to as "first, power control apparatus A". When the power failure detection device detects an interruption of the power supply from the external power source or the like, the first power control apparatus A is not supplied to all of the electrical appliances. Instead, by the first power control apparatus A, the electrical appliances are pre-classified into an electrical appliance to which a power is supplied from the private power supply equipment and an electrical appliance to which a power is not supplied from the private power supply equipment, and classification information is stored as the power supply information.

Furthermore, in the power control apparatus according to embodiments of present disclosure having the above-described preferred forms and configuration, the power control apparatus further includes an available power supply amount measuring device configured to measure an available power supply amount which can be supplied from the private power supply equipment or the like. The power supply information includes information regarding a priority of the electrical appliances to which power from the private power supply equipment or the like is not supplied when the power failure detection device detects an interruption of the power supply from the external power source or the like. When the power failure detection device detects an interruption of the power supply from the external power source or the like, the power supply control device can be configured to control the power supply to the electrical appliances based on the power supply information and the available power supply amount measured by the available power supply amount measuring device. In addition, the power control apparatus having such a configuration may be referred to as "first power control apparatus B" for convenience.

Specifically, in the first power control apparatus B, it is assumed that the available power supply amount measured by the available power supply amount measuring device is set to $PSL_p$, and a sum of power consumption values of the plurality of electrical appliances which should be supplied with power from the private power supply equipment or the like is set to $PCS_0$. In this case, power supply information regarding an electrical appliance which should be supplied with power from the private power supply equipment or the like and power supply information regarding an electrical appliance which is not supplied with power are stored in the storage device. Whether power should be supplied or not is determined depending on the value of $PCS_0/PSL_p$. More specifically, the following modes can be exemplified. In case (1) where $PCS_0/PSL_p \leq 1$, power is supplied from the private power supply equipment or the like to all electrical appliances. In case (2) where $1 < PCS_0/PSL_p \leq \alpha_1$, no power is not supplied from the private power supply equipment or the like to a first level of electrical appliance, but power is supplied from the private power supply equipment or the like to a second, third, and fourth levels of electrical appliances. In case (3) where $\alpha_1 < PCS_0/PSL_p \leq \alpha_2$, no power is supplied from the private power supply equipment or the like to the first and second levels of electrical appliances, but power is supplied from the private power supply equipment or the like to the third and fourth levels of electrical appliances. In case (4) where $\alpha_2 < PCS_0/PSL_p \leq \alpha_3$, no power is supplied from the private power supply equipment or the like to the first, second and third levels of electrical appliances, but power is supplied from the private power supply equipment or the like to the fourth level of electrical appliance. In case (5) where $\alpha_3 < PSC_0/PCL_p$, a warning is issued. Here, the number of levels and the value of $\alpha$ are only illustrative. For example, the number of levels or the value of $\alpha$ can be changed appropriately depending on the available power supply amount $PSL_p$. Regardless of whether the power failure detection device detects an interruption of the power supply from the external or the like, if $\alpha_3 < PCS_0/PSL_p$, then a warning may be issued.

Furthermore, in the power control apparatus according to embodiments of present disclosure having the above-described preferred forms and configuration, the power control apparatus further includes an available power supply amount measuring device configured to measure an available power supply amount which can be supplied from the private power supply equipment or the like. When the power failure detection device detects an interruption of power supply from the external power source or the like, the power supply information includes information regarding a priority of the electrical appliances to which power should be supplied with reducing an amount of power supply from the private power supply equipment or the like. When the power failure detection device detects an interruption of the power supply from the external power source or the like, the power supply control device can be configured to control the power supply to the electrical appliances based on the power supply information and the available power supply amount measured by the available power supply amount measuring device. In addition, the power control apparatus having such a configuration may be referred to as "first power control apparatus C" for convenience.

Specifically, in the first power control apparatus C, it is assumed that the available power supply amount measured by the available power supply amount measuring device is set to $PSL_p$, and a sum of power consumption values of the plurality of electrical appliances which should be supplied with power from the private power supply equipment or the like is set to $PCS_0$. In this case, power supply information regarding an electrical appliance in which power supplied from the private power supply equipment or the like is reduced and power supply information regarding an electrical appliance in which power supplied from the private power supply equipment or the like is not reduced are stored in the storage device. Whether power is reduced or not is determined depending on the value of $PCS_0/PSL_p$. More specifically, the following modes can be exemplified. In case (1) where $PCS_0/PSL_p \leq 1$, power is supplied from the private power supply equipment or the like to all electrical appliances without reducing the amount of power supply. In case (2) where $1 < PCS_0/PSL_p \leq \beta_1$, power is supplied from the private power supply equipment or the like to the first level of electrical appliance with reducing the amount of power supply, but power is supplied to the second, third and fourth levels of electrical appliances without reducing the amount of power supply. In case (3) where $\beta_1 < PCS_0/PSL_p \leq \beta_2$, power is supplied from the private power supply equipment or the like to the first and second levels of electrical appliances with reducing the amount of power supply, but power is supplied from the private power supply equipment or the like to the third and fourth levels of electrical appliances without reducing the amount of power supply. In case (4) where $\beta_2 < PCS_0/PSL_p \leq \beta_3$, power is supplied from the private power supply equipment or the like to the first, second and third levels of electrical appliances with reducing the amount of power supply, but power is supplied from the private power supply equipment or the like to the fourth level of electrical appliance without reducing the amount of power supply. In case (5) where $\beta_3 < PCS_0/PSL_p$, a warning is issued. Here, the number of levels or the value of $\beta$ is only illustrative. For example, the number of levels or the value of $\alpha$ can be changed appropriately depending on the available power supply amount $PSL_p$. Regardless of whether the power failure detection device detects an interruption of the power supply from the external or the like, if $\beta_3 < PCS_0/PSL_p$, then a warning may be issued.

In this respect, in the first power control apparatus C, the power supply to the electrical appliances is preferably controlled in any one type of mode selected from the group including limitation on the amount of power usage in the electrical appliance, or transition to power saving mode of the electrical appliance, transition to energy saving mode of the electrical appliance, transition to standby mode of the electrical appliance, transition to idle mode of the electrical appliance, transition to waiting mode of the electrical appliance, transition to low-power operation mode of the electrical appliance and transition to sleep mode of the electrical appliance. In these cases, an instruction for the electrical appliance is preferably carried out through an electric power line or indoor wiring which connects the power control apparatus with the electrical appliance. In addition, the instruction for the electrical appliance is preferably carried out based on a modulated electrical signal (an operation control signal), and specifically, this may be performed using a power line communication (PLC) technique. However, embodiments of the present disclosure are not limited thereto, but a wireless, communication line, or public line can be used. In this case, it is desirable that the power control apparatus includes a communication device.

In addition, embodiments of the present disclosure are not limited to the configuration described above. For example, while starting the power supply from the private power supply equipment or the like, the power control apparatus may make an inquiry about the electrical appliances. As a result, when the power control apparatus receives information, which indicates that the electrical appliance is an electrical appliance in which the power supply from the private power supply equipment or the like is not stopped or reduced, from the electrical appliance, there may be employed a configuration in which the power supply from the private power supply equipment or the like to the electrical appliance is not stopped or reduced. On the other hand, when the power control apparatus receives information, which indicates that the electrical appliance is an electrical appliance in which the power supply from the private power supply equipment or the like can be stopped or reduced, from the electrical appliance, there may be employed a configuration in which the power supply from the private power supply equipment or the like to the electrical appliance is stopped or reduced.

Moreover, when the power failure detection device detects an interruption of the power supply from the external power source or the like, the power supply control device controls the power supply to the electrical appliances based on the power supply information (the first power control apparatus A), or alternatively, the power supply control device controls the power supply to the electrical appliances based on the power supply information and the available power supply amount measured by the available power supply amount measuring device (the first power control apparatus B or the first power control apparatus C). These controls for the power supply to the electrical appliances may be collectively referred to as "power supply restriction".

The first power control apparatus A and the first power control apparatus B can be combined with each other. The first power control apparatus A and the first power control apparatus C can be combined with each other. The first power control apparatus B and the first power control apparatus C can be combined with each other. The first power control apparatus A, the first power control apparatus B, and the first power control apparatus C can be combined with each other.

Furthermore, in the power control apparatus according to embodiments of present disclosure having various types of preferred forms and configurations described above, the power supply information can include information regarding the electrical appliance which should be continuously supplied with power from the private power supply equipment or the like, even when the power supply interruption duration measured by the power failure detection device is in excess of a predetermined time period. In addition, the power control apparatus having such a configuration may be referred to as "second power control apparatus A" for convenience. Here, an example of the electrical appliance which should be continuously supplied with power from the private power supply equipment or the like may include various types of medical devices such as inhaler containing nebulizer or steam inhaler, oxygen concentrator, pulse oximeter, respirator, apnea syndrome monitor, dialysis machine, blood purification equipment, patient monitoring device, syringe or infusion pump, or home medical treatment device; security-related devices such as electronic locks and surveillance camera; overnight energized computers; telephones or fax; commercial freezers.

Moreover, in the power control apparatus according to embodiments of present disclosure having various types of preferred forms and configurations described above, the power supply information can include information regarding an electrical appliance in which power supply from the private power supply equipment or the like should be stopped when the power supply interruption duration measured by the power failure detection device is in excess of a predetermined time period. When the power supply interruption duration is in excess of the predetermined time period, the power supply control device can be configured to stop the power supply to the electrical appliance based on the power supply information. Namely, by the power supply control device, the electrical appliances are pre-classified into an electrical appliance to which a power is supplied from the private power supply equipment and an electrical appliance to which a power is not supplied from the private power supply equipment, and classification information is stored as the power supply information. In addition, the power control apparatus having such a configuration may be referred to as "second power control apparatus B" for convenience. Alternatively, the power supply information includes information regarding a priority of the electrical appliances to which power supplied from the private power supply equipment or the like should be stopped when the power supply interruption duration measured by the power failure detection device is in excess of a predetermined time period. When the power supply interruption duration is in excess of a predetermined time period, the power supply control device can be configured to stop the power supply to the electrical appliances in a sequential manner based on the power supply information. In addition, the power control apparatus having such a configuration may be referred to as "second power control apparatus C" for convenience. Specifically, for example, the following modes can be exemplified. If the power supply interruption duration is in excess of a predetermined time period $T_1$, then the power supply to the first level of electrical appliance is stopped. If the power supply interruption duration is in excess of a predetermined time period $T_2$ ($T_2>T_1$), then the power supply to the second level of electrical appliance is stopped. If the power supply interruption duration is in excess of a predetermined time period $T_3$ ($T_3>T_2$), then the power supply to the third level of electrical appliance is stopped. If the power supply interruption duration is in excess of a predetermined time period $T_4$ ($T_4>T_3$), then the power supply to the fourth level of electrical appliance is stopped.

Further, in the power control apparatus according to embodiments of present disclosure having various types of preferred forms and configurations described above, the power supply information includes information regarding an electrical appliance in which the amount of power supply from the private power supply equipment or the like should be reduced (including information regarding a priority of the electrical appliances in which the amount of power supply should be reduced) when the power supply interruption duration measured by the power failure detection device is in excess of a predetermined time period. When the power supply interruption duration is in excess of a predetermined time period, the power supply control device can be configured to reduce the power supply to the electrical appliances based on the power supply information. In addition, the power control apparatus having such a configuration may be referred to as "second power control apparatus D" for convenience. Specifically, when the power supply interruption duration is in excess of a predetermined time period, the power supply control device allows the electrical appliances to be previously classified into an electrical appliance which is supplied with power from the private power supply equipment or the like with reducing the amount of power supply and an electrical appliance which is supplied with power from the private power supply equipment or the like without reducing the amount of power supply, and allows this classification information to be stored as the power supply information. Alternatively, specifically, for example, if the power supply interruption duration is in excess of a predetermined time period $T_1$, power is supplied to the first level of electrical appliance with reducing the amount of power supply. If the power supply interruption duration is in excess of a predetermined time period $T_2$ ($T_2>T_1$), then power is supplied to the second level of electrical appliance with reducing the amount of power supply. If the power supply interruption duration is in excess of a predetermined time period $T_3$ ($T_3>T_2$), then power is supplied to the third level of electrical appliance with reducing the amount of power supply. If the power supply interruption duration is in excess of a predetermined time period $T_4$ ($T_4>T_3$), then power is supplied to the fourth level of electrical appliance with reducing the amount of power supply. Furthermore, in these cases, the reduction in the amount of power supply is preferably performed in a mode selected from the group including limitation on the amount of power usage in the electrical appliance, or transition to power saving mode of the electrical appliance, transition to energy saving mode of the electrical appliance, transition to standby mode of the electrical appliance, transition to idle mode of the electrical appliance, transition to waiting mode of the electrical appliance, transition to low-power operation mode of the electrical appliance and transition to sleep mode of the electrical appliance. In these cases, an instruction for the electrical appliance is preferably carried out through a power line, electric wiring or indoor wiring which connects the power control apparatus with the electrical appliance. In addition, the instruction for the electrical appliance is preferably carried out based on a modulated electrical signal (an operation control signal), and specifically, this may be performed using a power line communication (PLC) technique. However, embodiments of the present disclosure are not limited thereto, but wireless link, communication line, or public line can be used. In this case, it is desirable that the power control apparatus includes a communication device.

The second power control apparatus A and the second power control apparatus B can be combined with each other. The second power control apparatus A and the second power control apparatus C can be combined with each other. The second power control apparatus A and the second power control apparatus D can be combined with each other. The second power control apparatus A, the second power control apparatus B, and the second power control apparatus D can be combined with each other. The second power control apparatus A, the second power control apparatus C, and the second power control apparatus D can be combined with each other.

Further, in the power control apparatus according to embodiments of present disclosure having various types of preferred forms and configurations described above, the power supply control device may be configured to store a plurality of predetermined time periods. In this case, the power supply control device may be configured to store a plurality of predetermined time periods including a predetermined time period according to season and/or a predetermined time period according to time zone. The predetermined time periods may be automatically changed by the power supply control device according to season and/or time zone. The change of the predetermined time periods may be performed by a user or the like of the electrical appliance.

Moreover, in the power control apparatus according to the first embodiment of the present disclosure having various types of preferred forms and configurations described above, the private power supply equipment can be composed of a storage battery (an electric condenser). Alternatively, the private power supply equipment can be in the form of including a photovoltaic power generation device, a solar thermal power generation device, a photovoltaic and solar thermal power generation device, fuel cells, a wind power generation device, a biomass power generation device, or a waste power generation device. Alternatively, the private power supply equipment can include a combination of storage battery and photovoltaic power generation device, a combination of storage battery and solar thermal power generation device, a combination of storage battery, photovoltaic power generation device, and solar thermal power generation device, a combination of storage battery and fuel cells, a combination of storage battery and wind power generation device, a combination of storage battery and biomass power generation device, or a combination of storage battery and waste power generation device. Alternatively, the private power supply equipment may be in the form of a private power generation device. These devices itself may have a known configuration and structure.

In the power control apparatus according to the first or second embodiment of the present disclosure having various types of preferred forms and configurations described above (hereinafter, it may be collectively referred to as "power control apparatus or the like of present disclosure"), the power failure detection device, the storage device, and the power supply control device itself may be configured to include known circuits or the like. The storage of the power supply information in the storage device or the input of a predetermined time period to the power supply control device may be performed, for example, using an input device or a personal computer, alternatively, using a communication means such as a portable phone and a communication line. In a case of the use of a communication means or a communication line, the power control apparatus or the like of present disclosure preferably includes a communication device. The power control apparatus or the like of present disclosure or the electrical appliances are preferably connected to the Internet from the viewpoint of acquisition or exchange of various data. In addition, in the power control apparatus, various devices or circuits constituting the power control apparatus may be configured as an integrated form, or may be configured to be disposed as separate devices or circuits, for example, connected to each other through a communication means or a signal transmission means.

Example forms of the power supply from an external power source, a first external power source, and a second external power source may include a so-called a commercial power supply and may include a power supply through a power distribution line (including power transmission line or electric line). An example of power distribution network configuration method may include spot network substation, regular network arrangement (low-voltage network system), low-voltage banking system, main-spare lines system (ring-shaped system), branch-type distribution system (radial-shaped system), and so on. In addition, an example of the power distribution line may include high-tension distribution line (distribution line which is overhead conductors in residential areas, and is commonly used as a lead-in wire exceeding 50 kVA and below 2000 kVA) and low-tension distribution line (distribution line which commonly used as a lead-in wire below 50 kVA in detached house and so on).

The power control apparatus or the like of present disclosure may be provided, for example, between the low-tension distribution line and an ampere breaker or switchboard, or alternatively, between an ampere breaker or switchboard and an electrical appliance. The power failure detection device detects the power supply from an external power source and measures a power supply interruption duration. However, when the power control apparatus or the like of present disclosure is provided between an ampere breaker or switchboard and an electrical appliance, an interruption of the power supply from an external power source include a power interruption in an ampere breaker or switchboard, and an interruption duration of the power supply from an external power source include an interruption duration of power in an ampere breaker or switchboard.

In the power control apparatus or the like of present disclosure, the sum $PCS_O$ of power consumption values of the plurality of electrical appliances may be obtained continuously. In addition, a power supply available time at which power can be supplied from the private power supply equipment or the like to the plurality of electrical appliances can be obtained. The power supply available time is based on the obtained sum $PCS_O$ of power consumption values of the plurality of electrical appliances and a power supply amount $PSL_O$ from the private power supply equipment or the like (or the available power supply amount $PSL_p$, measured an available power supply amount measuring device). Therefore, this power supply available time or the time obtained by multiplying the power supply available time by a coefficient less than "1" can be set to a predetermined time period. Alternatively, as described later, the sum of power consumption values of the plurality of electrical appliances may be predicted continuously. The power supply available time at which power can be supplied from the private power supply equipment or the like to the plurality of electrical appliances can be obtained based on a predictive value $PCS_p$ of the obtained sum of power consumption values of the plurality of electrical appliances and the power supply amount $PSL_O$ from the private power supply equipment or the like (or the available power supply amount $PSL_p$ measured by the available power supply amount measuring device). Therefore, this power supply available time or the time obtained by multiplying the power supply available time by a coefficient less than "1" can be set to a predetermined time period. Such a configuration in the power control apparatus or the like of present disclosure may be referred to as "power control apparatus-A of present disclosure". In this way, in the power control apparatus-A of present disclosure, the predetermined time period varies dynamically depending on the power consumption values of the plurality of electrical appliances connected to the power control apparatus.

Alternatively, in the power control apparatus or the like of present disclosure, the sum $PCS_O$ of power consumption values of the plurality of electrical appliances may be obtained continuously. In a case where the power failure detection device detects an interruption of the power supply from the external power source or the like, if the sum $PCS_O$ of power consumption values at that point in time is in excess of the power supply amount $PSL_O$ from the private power supply equipment or the like (or the available power supply amount $PSL_p$ measured by the available power supply amount measuring device) and the power supply interruption duration measured by the power failure detection device is in excess of a predetermined time period, the power supply control device may be configured to stop the power supply to the electrical appliances in a sequential manner based on the power supply information, or alternatively, the power supply control device may be configured no that the power supply to the electrical appliances is reduced. Alternatively, the sum of power consumption values of the plurality of electrical appliances may be predicted continuously. In a case where the power failure detection device detects an interruption of the power supply from the external power source or the like, if a predictive value $PCS_p$ of the sum of power consumption values at that point in time is in excess of the power supply amount $PSL_0$ from the private power supply equipment or the like (or the available power supply amount $PSL_p$ measured by the available power supply amount measuring device) and the power supply interruption duration measured by the power failure detection device is in excess of a predetermined time period, the power supply control device may be configured to stop the power supply to the electrical appliances in a sequential manner based on the power supply information, or alternatively, the power supply control device may be configured to reduce the supply power to the electrical appliances. Such a configuration in the power control apparatus or the like of present disclosure may be collectively referred to as "power control apparatus-B of present disclosure". In the power control apparatus-B of present disclosure, for example, it is desirable to employ the second power control apparatus C or the second power control apparatus D, but it is not limited thereto.

In the power control apparatus-A or power control apparatus-B of present disclosure, since it is evaluated whether the sum $PCS_0$ of the power consumption values of the plurality of electrical appliances or the predictive value $PCS_p$ of the sum is in excess of the power supply amount $PSL_0$ from the private power supply equipment or the like (or the available power supply amount $PSL_p$ measured by the available power supply amount measuring device), in cases such as where the power supply amount from the private power supply equipment or the like is insufficient, the power supply to be supplied from the private power supply equipment or the like to the plurality of electrical appliances can be more precisely controlled. In other words, the instructions for stopping, reducing, and saving power supplied to the electrical appliances connected to the power control apparatus can be more precisely controlled.

In the power control apparatus-A or power control apparatus-B of present disclosure, it can be configured to obtain a power consumption value of the electrical appliance by measuring power consumption of the electrical appliances. Alternatively, in the power control apparatus-A or power control apparatus-B of present disclosure, it can be configured to obtain a nominal power consumption value of the electrical appliance as the power consumption value. The measurement of the power consumption value of the electrical appliance can be performed individually for each of the plurality of electrical appliances, it can be performed for the entire plurality of electrical appliances, or it can be performed for each group formed by grouping the plurality of electrical appliances. An example of the device for measuring the power consumption value of the electrical appliance may include, for example, a power meter, or alternatively, include a power outlet or power strip (specifically, outlet type, strip type, expansion adapter, etc.) having functions of power metering, controlling, and communication. An example of the sum of the power consumption values of the plurality of electrical appliances may include (1) a sum of measured values of power consumption values of the electrical appliances, (2) a sum of nominal power consumption values of the electrical appliances, and (3) a total sum of the sum of measured values of power consumption values of the electrical appliances and the sum of nominal power consumption values of the electrical appliances.

In a case where a nominal power consumption value of the electrical appliance is set to the power consumption value, the power control apparatus-A or power control apparatus-B of present disclosure can be configured to further include a nominal power consumption value storage device for storing a nominal power consumption value of the electrical appliance. In addition, the nominal power consumption value storage device may configured as an integrated form with the power control apparatus (specifically, for example, the power supply control device), or may be configured to be disposed as a separate device (or circuit) from the power control apparatus. In these cases, the nominal power consumption value storage device may be in the form of a combination of a CPU and a storage means (for example, a memory). In order to store the nominal power consumption value of the electrical appliance in this nominal power consumption value storage device, predetermined information including the nominal power consumption value of the electrical appliance may be stored in the nominal power consumption value storage device, for example, using an input device or a personal computer, or alternatively, using a communication means such as portable phone and a communication line. In a case of the use of a communication means and a communication line, the power control apparatus-A or power control apparatus-B of present disclosure preferably includes a communication device.

In the power control apparatus-A or power control apparatus-B of present disclosure having various types of preferred forms and configurations described above, examples of prediction of power consumption value may include as follows. (a) a prediction of power consumption value of the electrical appliance based on a nominal power consumption value, (b) a prediction based on historical weather data, (c) a prediction based on weather information or weather forecasts, (d) a prediction based on a trend or tendency of change in a measured temperature value (for example, a measured room temperature value), (e) a prediction based on time zone or season, (f) a prediction based on an expected electric power demand, (g) a prediction based on a database regarding a power consumption pattern in the electrical appliance, (h) a prediction of variation in units of a day, a week, a month or a year, and (i) a prediction based on change or variation in the sum of power consumption values obtained per unit time.

In the power control apparatus-A or power control apparatus-B of present disclosure having various types of preferred forms and configurations described above, if the sum or predictive value of the obtained power consumption values is in excess of the power supply amount from the private power supply equipment or the like even just for an instant, the sum or predictive value of the obtained power consumption values may be set to be in excess of the amount of power supply from the private power supply equipment or the like. In a state where the sum or predictive value of the obtained power consumption values is in excess of the power supply amount from the private power supply equipment or the like is continued for a period of time t (for example, t may be any period of time such as one second, ten seconds, thirty seconds, one minute, five minutes, ten minutes, etc.), the sum or predictive value of the obtained power consumption values may be set to be in excess of the power supply amount from the private power supply equipment or the like. Determination of whether the sum or predictive value of the obtained power consumption values is in excess of the power supply amount from the private power supply equipment or the like may be performed, as described above, based on a measured value of the power consumption value of the electrical appliance, based on a nominal power consumption value of the electrical appliance, and based on the measured value and the nominal power consumption of the power consumption value of the electrical appliance.

An example of operation state of the electrical appliance when obtaining the power consumption value of the electrical appliance may include, for example, whether power is supplied to an electrical appliance, whether the electric appliance is in a state immediately after the electrical appliance starts the operation, whether the electrical appliance is operated stably, and whether the electrical appliance is in a low power consumption state. For example, for a refrigerator or freezer, and an air conditioner, the power consumption is increasing rapidly when a compressor thereof is started up. For a laser printer, the power consumption is increasing rapidly when printing is started. In addition, for a washing machine, the power consumption varies greatly in water storage, washing, rinsing, dehydration or the like. On the other hand, for a personal computer, a television receiver, audio equipment, a video recorder and so on, variation of the power consumption is small. An example of the electrical appliance may include electrical appliances which are running constantly such as a refrigerator; electrical appliances which are operating for a long time such as an air conditioner or ventilation fan; electrical appliances which are running at least a few hours such as a personal computer, a television receiver, audio equipment, video recorders, a rice cooker, an electric kettle, an electric pot, a coffee maker, a mobile phone charger, and a rechargeable battery charger for electric vehicle; electrical appliances which are running for about one hours such as a washing machine, a clothes dryer, a dishwasher, a vacuum cleaner, and a hot plate or grill pan; electrical appliances which are running for a few minute to tens of minutes such as a dryer, a microwave oven, an oven, and various printers.

In the power control apparatus or the like of present disclosure, the power supplied from the external or the like to an electrical appliance is composed of a packet structure which includes a header portion and a payload. The payload corresponds to an electric power. The header portion may be a form at least including power generation source information. Alternatively, the header portion may include the power generation source information and information regarding the power supply amount. An example of information included in the header portion may include, specifically, (A) power generation source information or information about types of electric power (for example, including thermal power generation using coal and oil; power generation based on natural gas; nuclear power generation; hydroelectric power; green energy using the power of nature such as photovoltaic power, wind power, geothermal power, biomass power, tidal power, ocean thermal energy conversion), (B) information regarding the power supply amount (a value of power to be supplied), (C) electric energy which is a payload length of the payload, (D) determination flag of AC/DC, (E) value of voltage, (F) code or ID of country or region, (G) code or ID of power generating, manufacturing and distributing company, (H) discrimination flag of commercial/private purpose, (I) power delivery source address, (J) identification information of power delivering source, (K) power delivery destination address, (L) identification information of power delivering destination, (M) a next header tag, (N) price per unit, (O) carbon dioxide emissions of power generation per unit time, (P) routing information of power transmission and distribution. In these cases, the power control apparatus preferably include a packet decomposition means, and, as necessary, may include a packet generation means.

An example of the control of power supply to the electrical appliance may include the interruption (or restriction) for individual electrical appliances or all of the plurality of electrical appliances and the decrease (reduction) in the power supply amount. In this case, in the power control apparatus or the like of present disclosure, the power supply may be controlled according to a predetermined procedure. Specifically, for example, the power supply may be stopped using a switch. Alternatively, the power supply may be controlled based on a method in which a control signal for stopping operation or for changing operation modes is sent to an electrical appliance and causes the electrical appliance to follow the control. The power supply from the external power source or the like to an electrical appliance may be performed through the power control apparatus, but it may be performed not through the power control apparatus. Alternatively, a mode of controlling the power supply to an electrical appliance may include a form in which what electrical appliance consumes power to what extent or will consume power is displayed on a display device. This allows a user of the electrical appliance to stop the use of a portion of the electrical appliance, to interrupt the use, or to cease the use, or alternatively, to switch operation mode of the electrical appliance into, for example, a saving mode, sleep mode or the like, or alternatively, to handle the change in the electrical appliance being used.

Example 1

Example 1 relates to the power control apparatus according to the first embodiment of the present disclosure, and particularly to the second power control apparatus A and the second power control apparatus B. In addition, Example 1 relates to the power supply control method and power supply control program according to the first embodiment of the present disclosure. FIG. 1 is a conceptual diagram illustrating the power control apparatus and electrical appliances of Example 1.

The power control apparatus of Example 1 or Examples 2 to 11 described later is a power control apparatus that supplies power from an external (commercial power source) and power from a private power supply equipment 50 to a plurality of electrical appliances 60. The power control apparatus includes a power failure detection device 20, a storage device 30, and a power supply control device 40. Here, the power failure detection device 20 detects a power supply interruption from an external power source (namely, detects a power failure) and measures a power supply interruption duration (namely, an interruption duration). The storage device 30 stores power supply information related to the power supply from the private power supply equipment 50 to the electrical appliances. In addition, when the power supply interruption duration measured by the power failure detection device 20 is in excess of a predetermined time period $T_0$, the power supply control device 40 controls the power supply from the private power supply equipment 50 to the electrical appliances based on the power supply information stored in the storage device 30. The power control apparatus (more specifically, the power supply control device 10) switches the power supply from the external power source into the power supply from the private power supply equipment 50 based on the detection of an interruption of the power supply from the external power source by the power failure detection device 20. In addition, for example, a user of the power control apparatus may enter the predetermined time period $T_0$ into the power supply control device 40 using an input device or a personal computer. The power control apparatus is supplied with power from the external power source through a low-tension power distribution line (a power line) 61.

In Example 1 or Examples 2 to 12 described later, the power failure detection device 20, the storage device 30, and the power supply control device 40 are composed of a known circuit having a CPU, a storage means (a memory) and so on, and are configured as an integrated circuit. In addition, each of the electrical appliances 60 is connected to the power control apparatus through an electrical wiring (or indoor wiring) 63, and is an electrical device supplied with power from the external power source. An operation control signal (a modulated electrical signal) for controlling an operation of each of the electrical appliances 60 is transmitted from the power supply control device 40 to each of the electrical appliances 60. The private power supply equipment 50 is composed of a storage battery an electric condenser). The power control apparatus is disposed between the low-tension power distribution line 61 and an ampere breaker 62 or switchboard.

In the power control apparatus $10_1$ of Example 1, even when the power supply interruption duration measured by the power failure detection device 20 is in excess of the predetermined time period $T_0$, the power supply information includes information regarding the electrical appliance 60 which should be continuously supplied with power from the private power supply equipment 50. In addition, when the power supply interruption duration measured by the power failure detection device 20 is in excess of the predetermined time period, the power supply information includes information regarding the electrical appliance 60 in which the power supply from the private power supply equipment 50 should be stopped.

The power supply control method of Example 1 is a power supply control method which controls the power supply from an external and a private power supply equipment to a plurality of electrical appliances. In the power supply control method, a power supply interruption duration is measured after an interruption of the power supply from an external is detected. When the power supply interruption duration is in excess of a predetermined time period, the power supply from the private power supply equipment to the electrical appliances is controlled based on power supply information regarding the power supply from the private power supply equipment to the electrical appliances. In addition, the power supply control program of Example 1 is a power supply control program which controls the power supply from an external and a private power supply equipment to a plurality of electrical appliances. In the power supply control program, a power supply interruption duration is measured after an interruption of the power supply from an external is detected. When the power supply interruption duration is in excess of a predetermined time period, the power supply from the private power supply equipment to the electrical appliances is controlled based on power supply information regarding the power supply from the private power supply equipment to the electrical appliances.

In the power control apparatus $10_1$ of Example 1, as described above, the interruption of the power supply from an external power source is detected (namely, a power failure is detected). Specifically, the power failure detection device 20 is constantly monitoring whether the power supply from an external power source is interrupted or not. More specifically, whether current is flowing through the power failure detection device 20 is constantly monitored. If no current flows through the power failure detection device 20, it is determined that the power supply from an external is interrupted, that is, the power failure is detected. The power failure detection device 20 then starts to measure a power supply interruption duration (power failure duration). At the same time, the power supply control device 10 switches the power supply from the external power source to the electrical appliances 60 into the power supply from the private power supply equipment 50 to the electrical appliances 60. Here, power is supplied from the private power supply equipment 50 to all of the electrical appliances 60.

When the power supply interruption duration (power failure duration) has elapsed and the power supply interruption duration is in excess of the predetermined time period $T_0$, the power supply control device 40 continues to supply power to an electrical appliance 60A which should be continuously supplied with power from the private power supply equipment 50, but the power supply control device 40 stops supplying power to an electrical appliance 60B which should be stopped being supplied with power from the private power supply equipment 50, based on the power supply information stored in the storage device 30. Specifically, for example, the power supply to the electrical appliance 60B may be stopped using a switch, or alternatively, an instruction for stopping the operation may be transmitted to the electrical appliance 60B through the electrical wiring (or indoor wiring) 63 which connects the power control apparatus $10_1$ to the electrical appliance 60B. The instruction that is transmitted to the electrical appliance 60B may be performed based on a modulated electrical signal (an operation control signal), and specifically, this may be performed using a power line communication (PLC) technique.

The power control apparatus of Example 1 includes the power failure detection device, the storage device, and the power supply control device. When the power supply interruption duration measured by the power failure detection device is in excess of a predetermined time period, the power control apparatus controls the power supply from the private power supply equipment to the electrical appliances based on the power supply information stored in the storage device. Therefore, it is possible to appropriately control the power supply from the private power supply equipment to the electrical appliances, for example, according to the length of the power failure duration without depending on power failure information from an external power source.

Example 2

Figure 2:
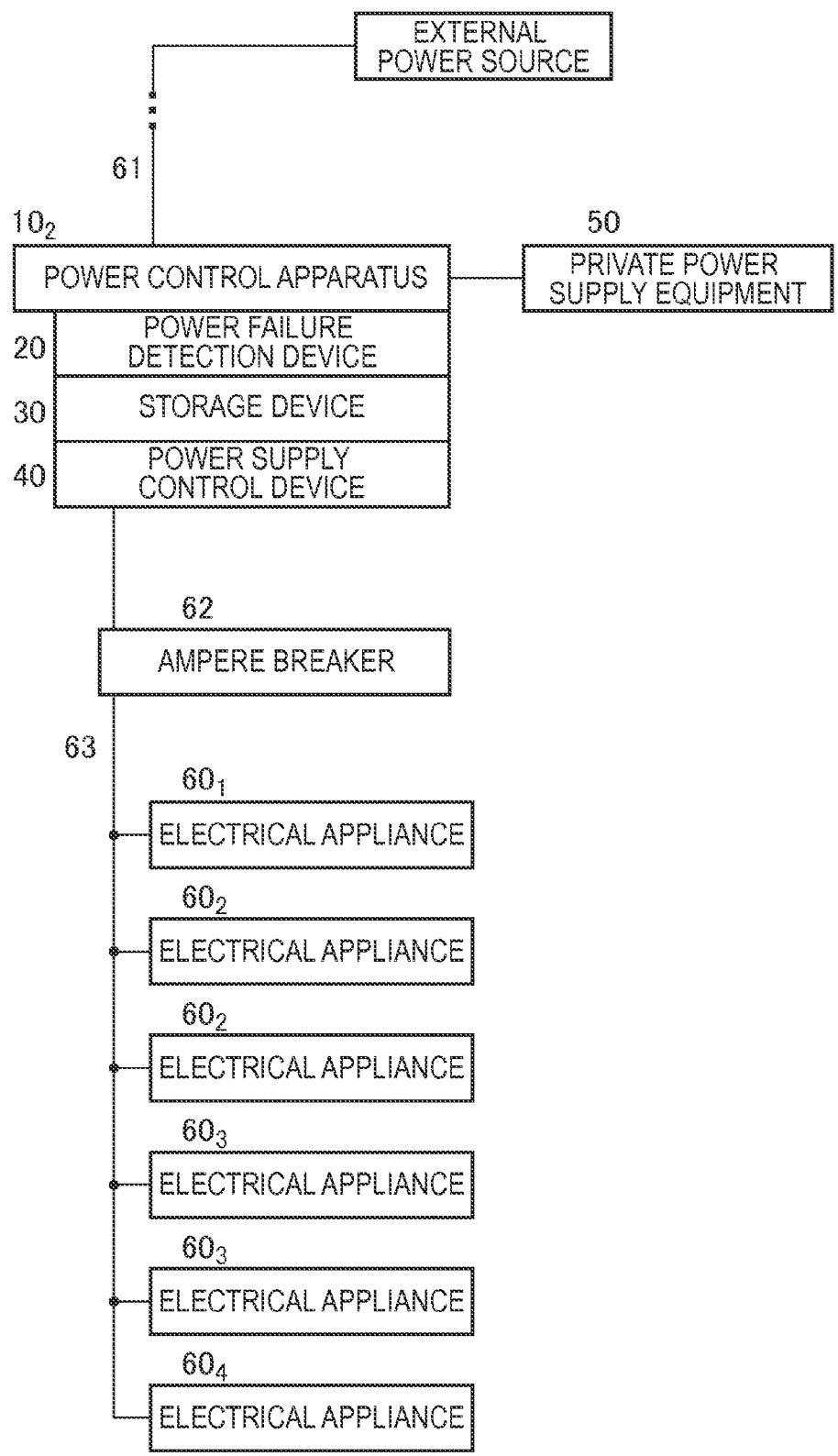
FIG. 2 is a conceptual diagram illustrating a power control apparatus and electrical appliances according to Example 2 and Example 3.

Example 2 is a modified example of Example 1 and relates to the second power control apparatus C. FIG. 2 is a conceptual diagram illustrating the power control apparatus and electrical appliances of Example 2. In Example 2, when the power supply interruption duration measured by the power failure detection device 20 is in excess of the predetermined time period $T_0$, the power supply information includes information regarding a priority of the electrical appliances 60 which should be stopped being supplied with power from the private power supply equipment 50. If the power supply interruption duration is in excess of the predetermined time period $T_0$, then the power supply control device 40 stops the power supply to the electrical appliances 60 in a sequential manner based on the power supply information. Namely, the power supply from the private power supply equipment 50 is stopped in the order of the electrical appliances 60 whose priorities are lower. Specifically, for example, if the power supply interruption duration is in excess of a predetermined time period $T_1$, then the power supply to a first level electrical appliance $60_1$ is stopped. If the power supply interruption duration is in excess of a predetermined time period $T_2(T_2>T_1)$, then the power supply to a second level electrical appliance $60_2$ is stopped. If the power supply interruption duration is in excess of a predetermined time period $T_3(T_3>T_2)$, then the power supply to a third level electrical appliance $60_3$ is stopped. If the power supply interruption duration is in excess of a predetermined time period $T_4(T_4>T_3)$, then the power supply to a fourth level electrical appliance $60_4$ is stopped.

The power control apparatus $10_2$ of Example 2 is substantially the same as that of Example 1 in terms of configuration and structure except for the above points, and thus detailed description thereof will be omitted.

Example 3

Example 3 is a modified example of Example 1 and relates to the second power control apparatus D. In addition, a conceptual diagram illustrating the power control apparatus and electrical appliances of Example 3 is substantially the same as that shown in FIG. 2. In Example 3, unlike Example 2, when the power supply interruption duration measured by the power failure detection device 20 is in excess of a predetermined time period, the power supply information includes information regarding an electrical appliance 60 which should be supplied with power with reducing the amount of power supply from the private power supply equipment 50 or information regarding a priority of the electrical appliances 60 which should be supplied with power with reducing the amount of power supply. If the power supply interruption duration is in excess of a predetermined time period $T_0$, then the power supply control device 40 reduces the power supply to the electrical appliance 60 based on the power supply information. Namely, the power supply from the private power supply equipment 50 is reduced in the order of the electrical appliances 60 whose priorities are lower. Specifically, by the first power control device 40, the electrical appliances 60 are pre-classified into the electrical appliance 60 to which a power is supplied from the private power supply equipment with reducing the amount of power supply and the electrical appliance 60 to which a power is not supplied from the private power supply equipment without reducing the amount of power supply, and classification information is stored as the power supply information. Alternatively, specifically, for example, if the power supply interruption duration is in excess of the predetermined time period $T_1$, then the power supply to the first level electrical appliance $60_1$ is reduced. If the power supply interruption duration is in excess of the predetermined time period $T_2$ $(T_2>T_1)$, then the power supply to the second level electrical appliance $60_2$ is reduced. If the power supply interruption duration is in excess of the predetermined time period $T_3$ $(T_3>T_2)$, then the power supply to a third level electrical appliance $60_1$ is reduced. If the power supply interruption duration is in excess of the predetermined time period $T_4$ $(T_4>T_3)$, then the power supply to a fourth level electrical appliance $60_1$ is reduced.

Furthermore, the reduction in the amount of power supply is performed in a mode selected from the group including limitation on the amount of power usage in the electrical appliance, or transition to power saving mode of the electrical appliance, transition to energy saving mode of the electrical appliance, transition to standby mode of the electrical appliance, transition to idle mode of the electrical appliance, transition to waiting mode of the electrical appliance, transition to low-power operation mode of the electrical appliance and transition to sleep mode of the electrical appliance. In these cases, an instruction for the electrical appliance is carried out through a power line, electric wiring (or indoor wiring) 63 which connects the power control apparatus with the electrical appliance. In addition, the instruction for the electrical appliance is carried out based on a modulated electrical signal (an operation control signal), and specifically, this may be performed using a power line communication (PLC) technique.

The power control apparatus of Example 3 is substantially the same as that of Example 1 in terms of configuration and structure except for the above points, and thus detailed description thereof will be omitted.

Example 4

Figure 3:
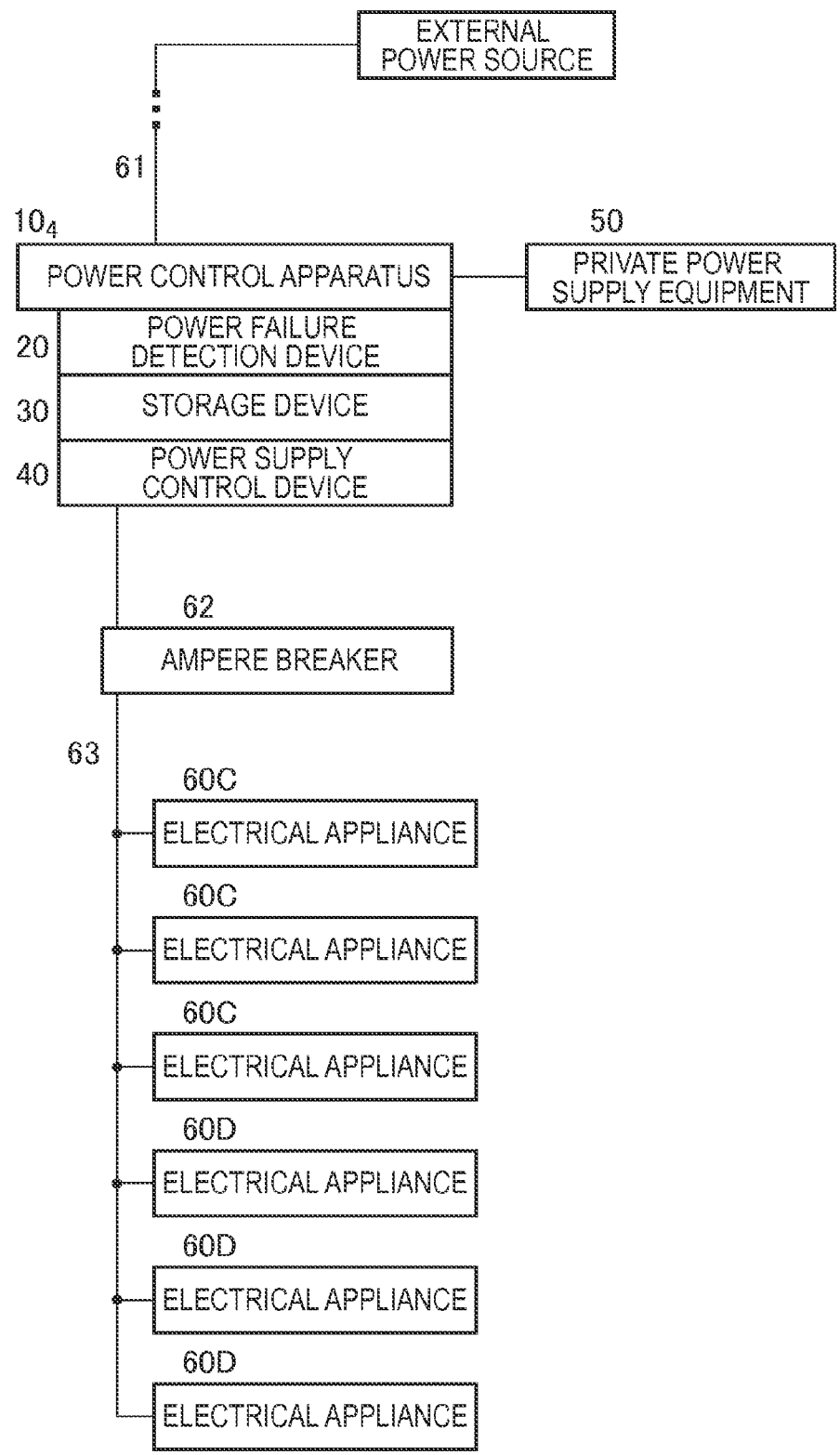
FIG. 3 is a conceptual diagram illustrating a power control apparatus and electrical appliances according to Example 4.

Example 4 is also a modified example of Examples 1 to 3, and relates to the first power control apparatus C. FIG. 3 is a conceptual diagram illustrating the power control apparatus and electrical appliances of Example 4. In Example 4, when the power failure detection device 20 detects an interruption of the power supply from an external power source, the power supply information includes information regarding an electrical appliance which is not supplied with power from the private power supply equipment 50. In this case, when the power failure detection device 20 detects an interruption of the power supply from an external power source, the power supply control device 40 controls the power supply to the electrical appliance based on the power supply information. Specifically, in the power control apparatus $10_4$ of Example 4, when the power failure detection device 20 detects an interruption of the power supply from an external power source, the power from the private power supply equipment 50 is not supplied to all of the electrical appliances. Instead, the electrical appliances are pre-classified into an electrical appliance 60C to which a power is supplied from the private power supply equipment 50 and an electrical appliance 60D to which a power is not supplied from the private power supply equipment 50, and classification information is stored as the power supply information. The classification of the electrical appliances 60C and 60D may be determined by a user of the electrical appliance or the power control apparatus. For example, the user may enter classification information into the storage device 30 as the power supply information using an input device or a personal computer.

In the power control apparatus of Example 4, as described above, when an interruption of the power supply from an external power source is detected (namely, when a power failure is detected), the power failure detection device 20 starts to measure a power supply interruption duration (power failure duration). At the same time, the power supply control device 40 switches the power supply form an external power source to the electrical appliance 60 into the power supply from the private power supply equipment 50 to the electrical appliance 60. However, in Example 4, unlike Example 1, the power from the private power supply equipment 50 is supplied to the electrical appliance 60A which should be supplied with power from the private power supply equipment 50, but the power from the private power supply equipment 50 is not supplied to the electrical appliance 60C which should be not supplied with power from the private power supply equipment 50.

The power control apparatus of Example 4 is substantially the same as those of Examples 1 to 3 in terms of configuration and structure except for the above points, and thus detailed description thereof will be omitted.

Example 5

Figure 4:
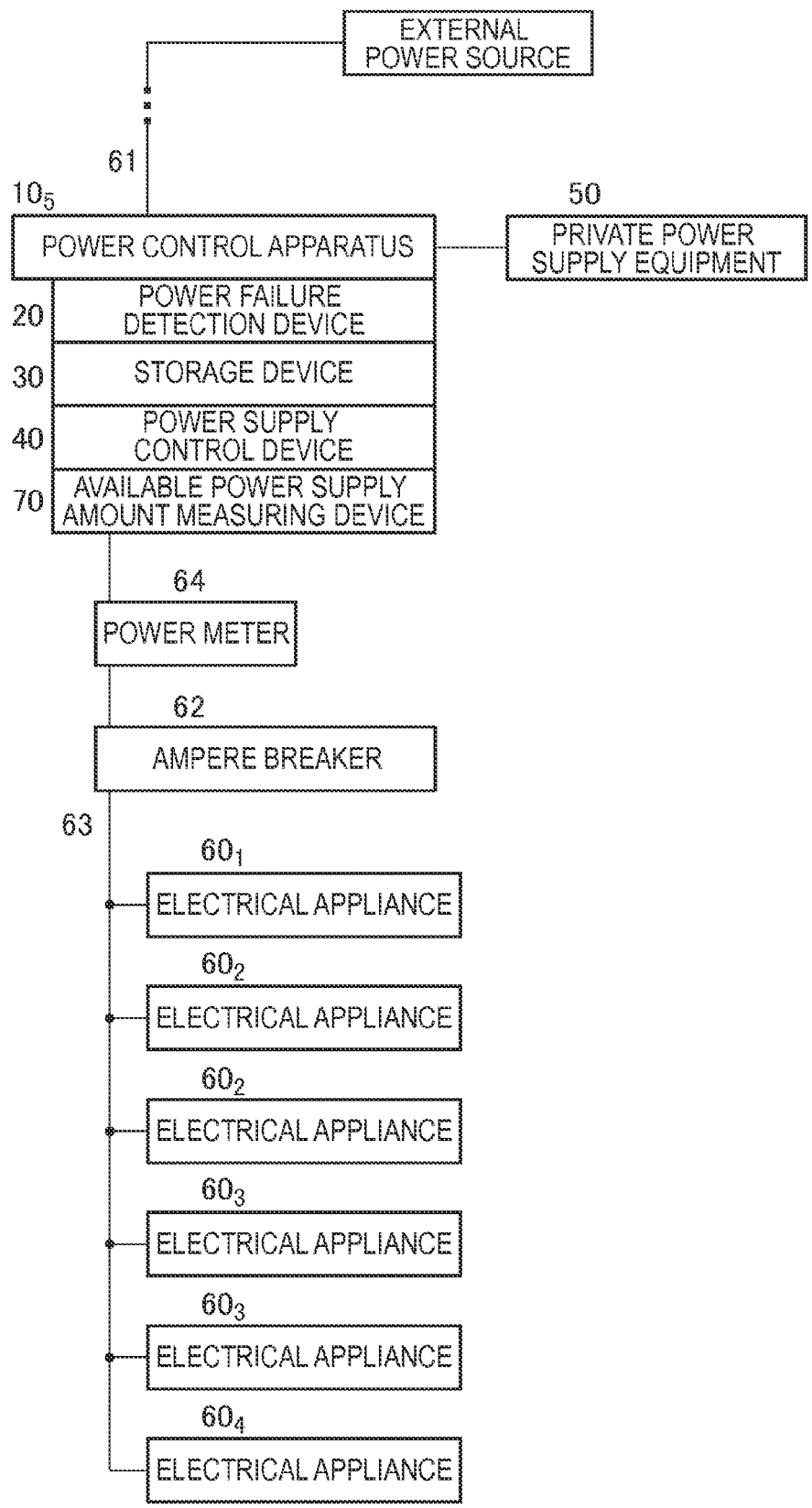
FIG. 4 is a conceptual diagram illustrating a power control apparatus and electrical appliances according to Examples 5, 6, 8, and 9.
Figure 5:
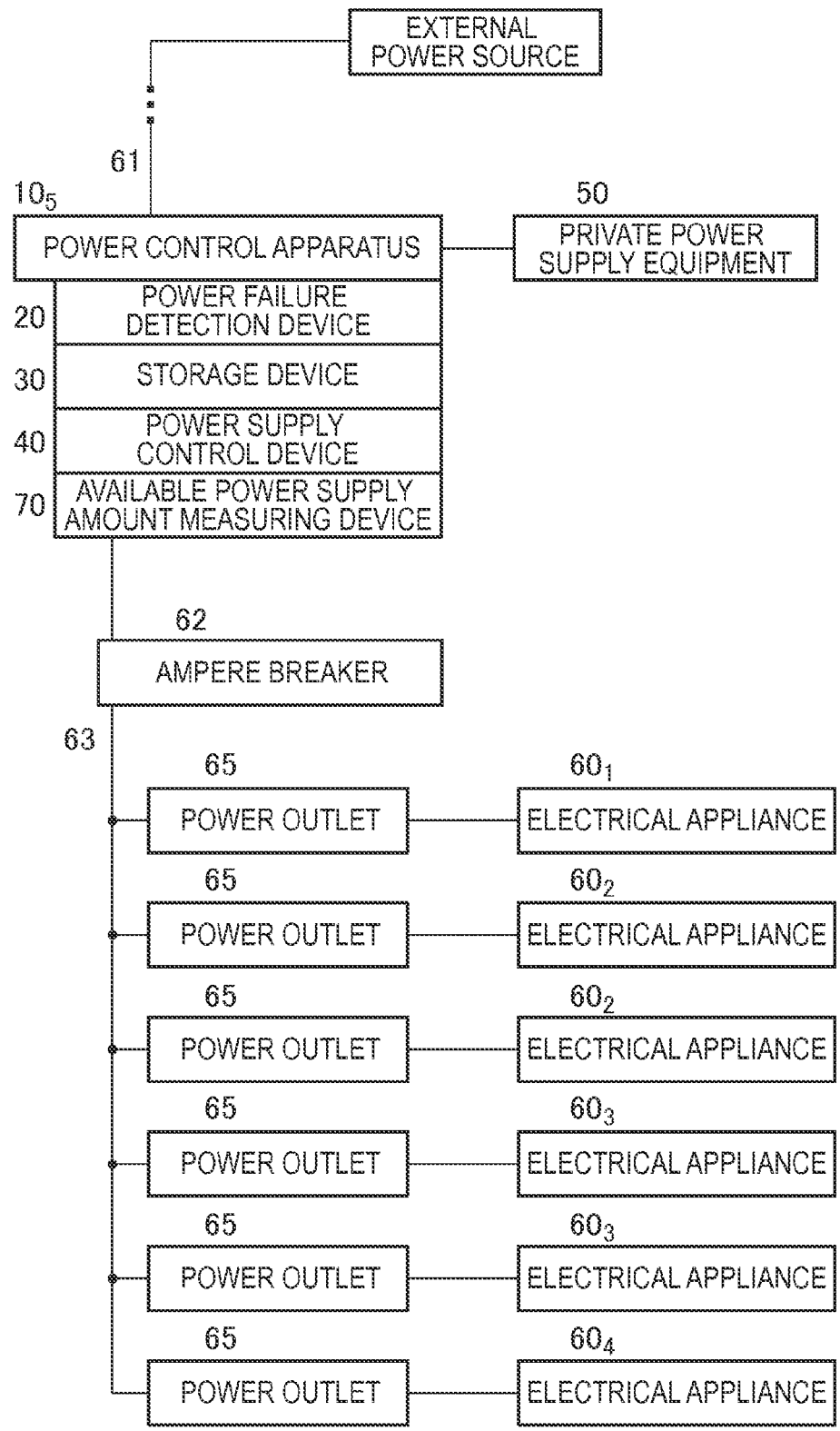
FIG. 5 is a modified example of the power control apparatus and electrical appliances according to Examples 5, 6, 8, and 9.

Example 5 is also a modified example of Examples 1 to 3, and relates to the first power control apparatus B. FIG. 4 and FIG. 5 are conceptual diagrams illustrating the power control apparatus of Example 5 and electrical appliances connected to the power control apparatus of Example 5.

The power control apparatus $10_5$ of Example 5 further include an available power supply amount measuring device 70 configured to measure an available power supply amount which can be supplied from the private power supply equipment 50. The available power supply amount measuring device 70 can be composed of a known circuit which measures a residual charging capacity of a storage battery (an electric condenser). When the power failure detection device 20 detects an interruption of the power supply from an external power source, the power supply information includes information regarding a priority of the electrical appliance 60 which is not supplied with power from the private power supply equipment 50. When the power failure detection device 20 detects an interruption of the power supply from an external power source, the power supply control device 40 controls the power supply to the electrical appliance 60 based on the power supply information and the available power supply amount measured by the available power supply amount measuring device 70. Namely, the power supply from the private power supply equipment 50 to the electrical appliances 60 is stopped in the order of the electrical appliances 60 whose priorities order is lower.

As illustrated in FIG. 4, the power control apparatus $10_5$ includes a power meter 64. Alternatively, as illustrated in FIG. 5, the power control apparatus $10_5$ includes a power outlet 65, a power strip or the like which performs power measuring, controlling, and communication functions. The power control apparatus $10_5$ acquires a power consumption value of the electrical appliance 60 by measuring power consumption of the electrical appliance 60. In other words, the power control apparatus $10_5$ measures the power consumption value of the electrical appliance 60. The measurement of the power consumption value for the electrical appliance 60 by the power control apparatus $10_5$ may be performed individually for each of the plurality of electrical appliances 60 (see FIG. 5), be it may be performed for the entire plurality of electrical appliances 60 (see FIG. 4), or it may be performed for each group formed by grouping the plurality of electrical appliances 60. For example, the sum of power consumption values of the plurality of electrical appliances 60 measured by the power meter 64 is transmitted to an A/D converter included in the power supply control device 40. The A/D converter then converts the sum of power consumption values into digital signals to be transmitted to a CPU.

In the power control apparatus $10_5$ of Example 5, when the available power supply amount measured by the available power supply amount measuring device 70 is assumed to be $PSL_p$, and the sum of power consumption values of the plurality of electrical appliances 60 which should be supplied with power from the private power supply equipment 50 is assumed to be $PCS_0$, power supply information regarding the electrical appliance 60 which should be supplied with power from the private power supply equipment 50 and power supply information regarding the electrical appliance 60 which is not supplied with power are stored in the storage device 30 depending on the value of $PCS_0/PSL_p$. A user of the electrical appliance or the power control apparatus may determine the power supply information. For example, the user may enter the power supply information into the storage device 30 as the power supply information using an input device or a personal computer.

More specifically, the following modes can be illustrated. In case (1) where $PCS_0/PSL_p \le 1$, power from the private power supply equipment 50 is supplied to all of the electrical appliances 60. In case (2) where $1 < PCS_0/PSL_p \le \alpha_1$ (where, for example, $\alpha_1 = 1.25$), power from the private power supply equipment 50 is not supplied to the first level of electrical appliance $60_1$, but power from the private power supply equipment 50 is supplied to the second, third, and fourth levels of electrical appliances $60_2$, $60_3$, and $60_4$. In case (3) where $\alpha_1 < PCS_0/PSL_p \le \alpha_2$ (where, for example, $\alpha_2 = 1.50$), power from the private power supply equipment 50 is not supplied to the first and second levels of electrical appliances $60_1$ and $60_2$, but power from the private power supply equipment 50 is supplied to the third and fourth levels of electrical appliances $60_3$ and $60_4$. In case (4) where $\alpha_2 < PCS_0/PSL_p \le \alpha_3$ (where, for example, $\alpha_3 = 1.75$), power from the private power supply equipment 50 is not supplied to the first, second, and third levels of electrical appliances $60_1$, $60_2$, and $60_3$, but power from the private power supply equipment 50 is supplied to the fourth level of electrical appliance $60_4$. In case (5) where $\alpha_3 < PCS_0/PSL_p$, a warning is issued. Here, the number of levels or the value of $\alpha$ is only illustrative.

Alternatively, the priority in which the plurality of electrical appliances are connected to the power control apparatus (the order in which power is supplied to the plurality of electrical appliances) is stored in the storage device 30. When the power failure detection device 20 detects an interruption of the power supply from an external power source, an operation control signal for stopping the operation is transmitted to an electrical appliance which is finally connected to the power control apparatus from among the plurality of electrical appliances. The electrical appliance, when receiving the operation control signal, stops the operation in accordance with a predetermined procedure. Alternatively, the power control apparatus stops the power supply (power transmission) to the electrical appliance, or, as described later, the amount of power supplied to the electrical appliance is reduced.

Alternatively, power consumption pattern codes of the plurality of electrical appliances are stored in the storage device 30. Here, the power consumption pattern codes includes a code indicating an electrical appliance in which the amount of power consumption increase rapidly at startup (referred to as "code 1"), a code indicating an electrical appliance in which the power consumption varies greatly during operation (referred to as "code 2"), a code indicating an electrical appliance in which the power consumption varies less during operation (referred to as "code 3"), and so on. When the power failure detection device 20 detects an interruption of the power supply from an external power source, the operation control signal for stopping the operation of the electrical appliance assigned with the code 1 or code 2 from among the plurality of electrical appliances is transmitted. The electrical appliance, when receiving the operation control signal, stops the operation in accordance with a predetermined procedure. Alternatively, if the electrical appliance assigned with the code 1 or code 2 is started up, then an operation control signal for ceasing the startup of the electrical appliance assigned with the code 1 or code 2 is transmitted, or the operation control signal for stopping the startup of the electrical appliance assigned with the code 1 or code 2 is transmitted. The electrical appliance, when receiving the operation control signal, stops or ceases the startup in accordance with a predetermined procedure. Alternatively, the power control apparatus stops the power supply (power transmission) to the electrical appliance, or as described later, the power control apparatus reduce the amount of power supplied to the electrical appliance.

The power control apparatus of Example 5 is substantially the same as those of Example 1 to Example 3 in terms of configuration and structure except for the above points, and thus detailed description thereof will be omitted.

In this way, in the power control apparatus of Example 5 or a power control apparatus of Example 6 described later, the number of the electrical appliances to which the power supply from the private power supply equipment 50 should be stopped or supplied is varies dynamically depending on the power consumption value of each of the plurality of electrical appliances connected to the power control apparatus. In other words, if the power consumption value of each of the plurality of electrical appliances 60 connected to the power control apparatus is low, then the number of the electrical appliances that is able to be supplied with power from the private power supply equipment 50 can be increased. On the other hand, if the power consumption value of each of the plurality of electrical appliances 60 connected to the power control apparatus is high, then the number of the electrical appliances that is able to be supplied with power from the private power supply equipment 50 can be reduced.

In the power control apparatus of Example 5 or a power control apparatus of Example 6 described later, it is evaluated whether the sum $PCS_0$ of the power consumption values of the plurality of electrical appliances is in excess of the available power supply amount $PSL_p$ measured by the available power supply amount measuring device 70 from the private power supply equipment. Therefore, in cases such as where the amount of power supplied from the private power supply equipment is insufficient, the power supply from the private power supply equipment to the plurality of electrical appliances can be more precisely controlled, in other words, the instructions for stopping, reducing, and saving power supplied to the electrical appliances connected to the power control apparatus can be more precisely controlled.

Example 6

Example 6 is a modified example of Example 1 to Example 3, and relates to the first power control apparatus C. In addition, the power control apparatus and electrical appliances of Example 6 are substantially the same as those shown in FIGS. 4 and 5. The power control apparatus of Example 6 also further includes the available power supply amount measuring device 70 for measuring an available power supply amount which can be supplied with power from the private power supply equipment 50. In Example 6, unlike Example 5, when the power failure detection device 20 detects an interruption of the power supply from an external power source, the power supply information includes information regarding the priority of the electrical appliances 60 in which the power supply from the private power supply equipment 50 should be reduced. When the power failure detection device 20 detects an interruption of the power supply from an external power source, the power supply control device 40 controls the power supply to the electrical appliances 60 based on the power supply information and the available power supply amount measured by the available power supply amount measuring device 70. In other words, the power supply from the private power supply equipment 50 is reduced in the order of the electrical appliances 60 whose priorities order is lower.

Specifically, in the power control apparatus of Example 6, power supply information regarding the electrical appliance 60 in which the power supply from the private power supply equipment 50 is reduced and power supply information regarding the electrical appliance 60 in which the power supply from the private power supply equipment 50 is not reduced are stored in the storage device 30 depending on the value of $PCS_0/PSL_p$. More specifically, the following modes can be illustrated. In case (1) where $PCS_0/PSL_p \leq 1$, power from the private power supply equipment 50 is supplied to all of the electrical appliances 60 without reducing the amount of power supply. In case (2) where $1<PCS_0/PSL_p \leq \beta_1$ (where, for example, $\beta_1=1.25$), power from the private power supply equipment 50 is supplied to the first level of electrical appliance $60_1$ with reducing the amount of power supply, but power from the private power supply equipment 50 is supplied to the second, third, and fourth levels of electrical appliances $60_2$, $60_3$, and $60_4$, without reducing the amount of power supply. In case (3) where $\beta_1<PCS_0/PSL_p \leq \beta_2$ (where, for example, $\beta_2=1.50$), the power from the private power supply equipment 50 is supplied to the first and second levels of electrical appliances $60_1$ and $60_2$, with reducing the amount of power supply, but the power from the private power supply equipment 50 is supplied to the third and fourth levels of electrical appliances $60_3$ and $60_4$, without reducing the amount of power supply. In case (4) where $\beta_2<PCS_0/PSL_p \leq \beta_3$ (where, for example, $\beta_3=1.75$), power from the private power supply equipment 50 is supplied to the first, second, and third levels of electrical appliances $60_1$, $60_2$, and $60_3$, with reducing the amount of power supply, but the power from the private power supply equipment 50 is supplied to the fourth level of electrical appliance $60_4$, without reducing the amount of power supply. In case (5) where $\beta_3<PCS_0/PSL_p$, a warning is issued. Here, the number of levels or the value of $\beta$ is only illustrative.

Furthermore, in the power control apparatus of Example 6, the power supply to the electrical appliance 60 may be controlled in any one type of mode selected from the group including limitation on the amount of power usage in the electrical appliance 60, or transition to power saving mode of the electrical appliance 60, transition to energy saving mode of the electrical appliance 60, transition to standby mode of the electrical appliance 60, transition to idle mode of the electrical appliance 60, transition to waiting mode of the electrical appliance 60, transition to low-power operation mode of the electrical appliance 60 and transition to sleep mode of the electrical appliance 60. In these cases, an instruction for the electrical appliance 60 is carried out through the electrical wiring (or indoor wiring) 63 which connects the power control apparatus with the electrical appliance 60. In addition, the instruction for the electrical appliance 60 is carried out based on a modulated electrical signal (an operation control signal), and specifically, this may be performed using a power line communication (PLC) technique.

The power control apparatus of Example 6 is substantially the same as those of Example 1 to Example 3 in terms of configuration and structure except for the above points, and thus detailed description thereof will be omitted.

The power control apparatus of Example 4 and the power control apparatus of Example 5 can be combined with each other. The power control apparatus of Example 4 and the power control apparatus of Example 6 can be combined with each other. The power control apparatus of Example 5 and the power control apparatus of Example 6 can be combined with each other. The power control apparatus of Example 4, the power control apparatus of Example 5, and the power control apparatus of Example 6 can be combined with each other.

Example 7

Example 7 is a modified example of Example 1 to Example 6, and relates to the power control apparatus-A of the present disclosure. In the power control apparatus of Example 7, the sum $PCS_0$ of power consumption values of the plurality of electrical appliances may be obtained continuously. In addition, a power supply available time at which power can be supplied from the private power supply equipment 50 to the plurality of electrical appliances 60 can be obtained. The power supply available time is based on the obtained sum $PCS_0$ of power consumption values of the plurality of electrical appliances 60 and a power supply amount $PSL_0$ from the private power supply equipment 50 (or the available power supply amount $PSL_p$ measured an available power supply amount measuring device 70). Therefore, this power supply available time or the time obtained by multiplying the power supply available time by a coefficient less than "1" can be set to a predetermined time period $T_0'$. In this way, in the power control apparatus of Example 7, the predetermined time period $T_0'$ varies dynamically depending on the power consumption values of the plurality of electrical appliances 60 connected to the power control apparatus. In other words, if the sum of power consumption values the plurality of electrical appliances 60 connected to the power control apparatus is low, then the predetermined time period $T_0'$ can be set to a long time. On the other hand, if the sum of power consumption values of the plurality of electrical appliances 60 connected to the power control apparatus is high, then the predetermined time period $T_0'$ can be set to a short time.

The power control apparatus of Example 7 is substantially the same as those of Example 1 to Example 6 in terms of configuration and structure except for the above points, and thus detailed description thereof will be omitted.

Alternatively, as described in Example 7, the sum of power consumption values of the plurality of electrical appliances 60 is predicted continuously. In addition, a power supply available time at which power can be supplied from the private power supply equipment 50 to the plurality of electrical appliances 60 can be obtained. The power supply available time is based on a predictive value $PCS_p$, the obtained sum of power consumption values of the plurality of electrical appliances 60 and a power supply amount $PSL_0$ from the private power supply equipment 50 (or the available power supply amount $PSL_p$ measured an available power supply amount measuring device 70). Therefore, this power supply available time or the time obtained by multiplying the power supply available time by a coefficient less than "1" can be set to a predetermined time period $T_0'$. In other words, if the predictive value of the sum of power consumption values the plurality of electrical appliances 60 connected to the power control apparatus is low, then the predetermined time period $T_0'$ can be set to a long time. On the other hand, if the predictive value of the sum of power consumption values of the plurality of electrical appliances 60 connected to the power control apparatus is high, then the predetermined time period $T_0'$ can be set to a short time.

Example 8

Example 8 is also a modified example of Example 1 to Example 6, and relates to the power control apparatus-B of the present disclosure. In the power control apparatus of Example 8, the sum $PCS_0$ of power consumption values of the plurality of electrical appliances 60 is obtained continuously. When the power failure detection device 20 detects an interruption of the power supply from an external power source, if the sum $PCS_0$ of power consumption values at that point in time is in excess of the power supply amount $PSL_0$ from the private power supply equipment 50 (or the available power supply amount $PSL_p$, measured by the available power supply amount measuring device 70) and the power supply interruption duration measured by the power failure detection device 20 is in excess of a predetermined time period, the power supply control device 40 stops the power supply to the electrical appliances in a sequential manner based on the power supply information.

Here, in a similar manner as illustrated in FIG. 4, the power control apparatus of Example 8 or a power control apparatus of Example 9 described later includes the power meter 64. Alternatively, in a similar manner as illustrated in FIG. 5, the power control apparatus includes a power outlet 65, a power strip or the like which performs power measuring, controlling, and communication functions. The power control apparatus acquires a power consumption value of the electrical appliance 60 by measuring power consumption of the electrical appliance 60. In other words, the power control apparatus measures the power consumption value of the electrical appliance 60. The measurement of the power consumption value for the electrical appliance 60 by the power control apparatus may be performed individually for each of the plurality of electrical appliances 60 (see FIG. 5), it may be performed for the entire plurality of electrical appliances 60 (see FIG. 4), or it may be performed for each group formed by grouping the plurality of electrical appliances 60.

In Example 8 or Example 9 described later, the power supply information includes information regarding the priority of the electrical appliances 60 in which the power supply from the private power supply equipment 50 should be stopped. When the power failure detection device 20 detects an interruption of the power supply from an external power source, if $PCS_0/PSL_0 > 1$ or $PCS_0/PSL_p > 1$, and the power supply interruption duration measured by the power failure detection device 20 is in excess of a predetermined time period, then the power supply control device 40 stops the power supply to the electrical appliances in a sequential manner based on the power supply information. In other words, the power supply from the private power supply equipment 50 is stopped or reduced in the order of the electrical appliances 60 whose priorities are lower. Specifically, for example, in case (I) where $1 < PCS_0/PSL_0$ (or $PCS_0/PSL_p) \le \gamma_1$, the power supply to the first level of electrical appliance $60_1$ is stopped or the power supply to the first level of electrical appliance $60_1$ is reduced, but the power supply to the second, third, and fourth levels of electrical appliances $60_2$, $60_3$, and $60_4$ is continued. In case (2) where $\gamma_1 < PCS_0/PSL_0$ (or $PCS_0/PSL_p) \le \gamma_2$, the power supply to the first and second levels of electrical appliances $60_1$ and $60_2$ is stopped or the power supply to the first and second levels of electrical appliances $60_1$ and $60_2$ is reduced, but the power supply to the third and fourth levels of electrical appliances $60_3$ and $60_4$ is continued. In case (3) where $\gamma_2 < PCS_0/PSL_0$ (or $PCS_0/PSL_p) \le \gamma_3$, the power supply to the first, second, and third levels of electrical appliances $60_1$, $60_2$, and $60_3$ is stopped or the power supply to the first, second, and third levels of electrical appliances $60_1$, $60_2$, and $60_3$ is reduced, but the power supply to the fourth level of electrical appliance $60_4$ is continued. In case (4) where $\gamma_3 < PCS_0/PSL_0$ (or $PCS_0/PSL_p$), the power supply to all of the electrical appliances is stopped or reduced.

Alternatively, the priority in which the plurality of electrical appliances are connected to the power control apparatus (the order in which power is supplied to the plurality of electrical appliances) is stored in the storage device 30. When the power supply interruption duration measured by the power failure detection device 20 is in excess of a predetermined time period, an operation control signal for stopping the operation is transmitted to an electrical appliance which is finally connected to the power control apparatus from among the plurality of electrical appliances. The electrical appliance, when receiving the operation control signal, stops the operation in accordance with a predetermined procedure. Alternatively, the power control apparatus stops the power supply (power transmission) to the electrical appliance, or the amount of power supplied to the electrical appliance is reduced.

Alternatively, in the power control apparatus of Example 8, in a similar manner as described in Example 5, the power consumption pattern codes of the plurality of electrical appliances are stored in the storage device 30. When the power supply interruption duration measured by the power failure detection device 20 is in excess of a predetermined time period, the operation control signal for stopping the operation of the electrical appliance, for example, assigned with the code 1 or code 2 from among the plurality of electrical appliances is transmitted. The electrical appliance, when receiving the operation control signal, stops the operation in accordance with a predetermined procedure. Alternatively, if the electrical appliance assigned with the code 1 or code 2 is started up, then an operation control signal for ceasing the startup of the electrical appliance assigned with the code 1 or code 2 is transmitted, or an operation control signal for stopping the startup of the electrical appliance assigned with the code 1 or code 2 is transmitted. The electrical appliance, when receiving the operation control signal, ceases or stops the startup in accordance with a predetermined procedure. Alternatively, the power control apparatus stops the power supply (power transmission) to the electrical appliance, or alternatively, the power control apparatus reduce the amount of power supplied to the electrical appliance.

The power control apparatus of Example 8 is substantially the same as those of Example 2 to Example 3 in terms of configuration and structure except for the above points, and thus detailed description thereof will be omitted.

In this way, in the power control apparatus of Example 8 or a power control apparatus of Example 9 described later, the number of the electrical appliances to which the power supply from the private power supply equipment 50 should be stopped or supplied is varies dynamically depending on the power consumption value of each of the plurality of electrical appliances connected to the power control apparatus. In other words, if the power consumption value of each of the plurality of electrical appliances 60 connected to the power control apparatus is low, then the number of the electrical appliances which can be supplied with power from the private power supply equipment 50 can be increased. On the other hand, if the power consumption value of each of the plurality of electrical appliances 60 connected to the power control apparatus is high, then the number of the electrical appliances which can be supplied with power from the private power supply equipment 50 can be reduced.

In the power control apparatus of Example 8 or a power control apparatus of Example 9 described later, it is evaluated whether the sum $PCS_0$ of the power consumption values of the plurality of electrical appliances (or the predictive value $PCS_p$ of the sum of power consumption values is in excess of the power supply amount $PSL_0$ from the private power supply equipment 50 (or the available power supply amount $PSL_p$ measured by the available power supply amount measuring device 70 from the private power supply equipment). Therefore, in cases such as where the amount of power supplied from the private power supply equipment is insufficient, the power supply from the private power supply equipment to the plurality of electrical appliances can be more precisely controlled. In other words, the instructions for stopping, reducing, and saving power supplied to the electrical appliances connected to the power control apparatus can be more precisely controlled.

Example 9

Example 9 is a modified example of Example 8.

For example, when power is supplied to an electrical appliance, it is possible to predict the extent to which power consumption value increases, based on a power consumption measurement value of the electrical appliance. Alternatively, It is possible to acquire power consumption prediction values of the plurality of electrical appliances based on a trend or tendency of the change in historical weather data, weather information or weather forecasts, a time zone or season, a measured temperature value (for example, a measured room temperature value). For example, it is possible predict statistically an increase in power consumption of an air conditioner when the temperature is raised 1° C. Alternatively, it is possible to obtain a power consumption prediction value of the plurality of electrical appliances based on a power demand forecast sent over the Internet from a power company. In addition, it is possible to obtain power consumption prediction values of the plurality of electrical appliances on the basis of the prediction based on a database related to the power consumption pattern in the electrical appliances 60 connected to the power control apparatus, or alternatively, the variation in the units of a day, a week, a month or a year, the change or variation in the sum of the power consumption values obtained per unit time. The power control apparatus learns the variation in the units of a day, a week, a month or a year and compiles a database with respect to the resultant power consumption patterns so that it is possible to create a database related to the power consumption pattern in the electrical appliances 60. These various data are stored in the storage device 30. Specifically, for example, the prediction may be a coefficient associated with various conditions (service environment of electrical appliances, etc.), and it can be obtained based on the accumulation of data of the past power usage trend or the like. For example, it is possible to obtain a predictive value of the sum by multiplying this coefficient (referred to as "prediction coefficient", for convenience) to the sum.

In Example 9, the power control apparatus measures the power consumption values of the electrical appliances 60, and obtains a predictive value $PCS_p$ of the sum of the measured power consumption values of the plurality of electrical appliances 60. Specifically, for example, the sum of the power consumption values of the plurality of electrical appliances 60 measured by the power meter 64 is sent to an A/D converter provided to the power supply control device 40. The A/D converter converts the sum into a digital value to be transmitted to a CPU. The CPU reads the predictive data (prediction coefficient) stored in the storage device 30 and obtains the predictive value $PCS_p$ of the sum of the measured power consumption values of the plurality of electrical appliances 60. Here, the predicted value $PCS_p$ of the sum is a value obtained by taking into account the prediction data, namely, a value obtained by multiplying the prediction coefficient to the sum.

In Example 9, the sum of power consumption values of the plurality of electrical appliances 60 is predicted continuously. When the power failure detection device 20 detects an interruption of the power supply from an external power source, if the predictive value $PCS_p$ of the sum of power consumption values at that point in time is in excess of the power supply amount $PSL_0$ from the private power supply equipment 50 (or the available power supply amount $PSL_p$ measured by the available power supply amount measuring device 70) and, in a similar manner as described in Example 8, the power supply interruption duration measured by the power failure detection device 20 is in excess of a predetermined time period, then the power supply control device 40 stops the power supply to the electrical appliances in a sequential manner based on the power supply information.

The power control apparatus of Example 9 is substantially the same as that of Example 8 in terms of configuration and structure except for the above points, and thus detailed description thereof will be omitted.

Example 10

Example 10 is a modified example of Example 9. The power control apparatus of Example 10 obtains a nominal power consumption value of the electrical appliance 60 as the power consumption value. The power control apparatus includes a nominal power consumption value storage device for storing a nominal power consumption value of the electrical appliance 60. The power control apparatus further controls the power supply to the electrical appliance 60 based on the nominal power consumption value stored in the nominal power consumption value storage device. The nominal power consumption value storage device, in Example 10, specifically, is configured integrally with the power control apparatus. In order to store the nominal power consumption value of the electrical appliance 60 in this nominal power consumption value storage device (specifically, the storage device 30), predetermined information including the nominal power consumption value of the electrical appliance 60 may be stored in the nominal power consumption value storage device (the storage device 30), for example, using an input device or a personal computer, or alternatively, using a communication means such as portable phone and a communication line.

Example 11

Example 11 is a modified example of Example 1 to Example 10. In Example 11, the power supplied to the electrical appliance 60 has a packet structure which is composed of a payload corresponding to the power and header information with a payload length of the payload. The header information includes, for example, amount of power supply, information about the type of power, a determination flag of AC/DC, a voltage value, power generation and manufacturing company codes, a discrimination flag of a commercial/private purpose. The power control apparatus 10 includes a packet decomposition means (not shown) for decomposing and extracting the header information from the packet structure, and thus it can read various types of information relevant to the power composed of the packet structure. Therefore, for example, it is possible to select a desired type of power as the type of power to be supplied to the electrical appliance 60.

Figure 7:
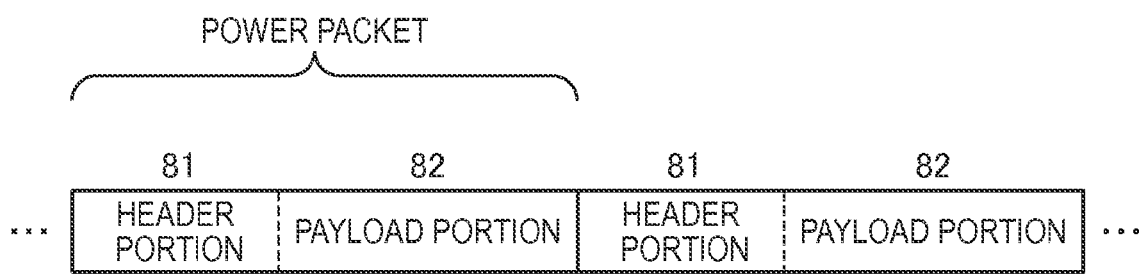
FIG. 7 is a conceptual diagram illustrating a power packet structure supplied to an electrical appliance.

In Example 11 the power (a power packet structure) supplied to the electrical appliance 60 is composed of a header portion 81 and a payload 82 as shown in FIG. 7. The payload 82 thus corresponds to the power, and the header portion includes power generation source information as identification information. Here, the power generation source information is information about the types of power, including thermal power generation using coal and oil; power generation based on natural gas; nuclear power generation; hydroelectric power; green energy using the power of nature such as solar photovoltaic power, wind power, geothermal power, biomass power, tidal power, ocean thermal energy conversion. The power supply control device 40 receives and disassembles identification information. Specifically, the power supply control device 40 receives the power composed of the packet structure including the header portion 81 and the payload 82, and then disassembles it into the header portion 81 and the payload 82. The power supply control device 40 then disassembles and extracts identification information from the header portion 81.

The power supply control device 40 includes a packet decomposition means. The power the supply control device 40 disassembles the power (power packet structure) composed of the packet structure including the header portion 81 and the payload 82 into the header portion 81 and the payload 82, and then analyzes power generation source information in the identification information. For example, the storage device 30 stores in advance information indicating that the reception of green energy is allowed but reception of other energy is not allowed. Such power reception information may be predetermined and stored in the storage device 30 by a user of the power control apparatus. More specifically, the power supply control device 40 may store a code indicating green energy in the storage device 30 and may check whether a code which is the power generation source information is coincident with the code stored in the storage device 30. As a result of analyzing the power generation source information by the power supply control device 40, if the received power is green energy, then the power supply control device 40 supplies power from an external power source to the electrical appliance 60. On the other hand, as a result of analyzing the power generation source information by the power supply control device 40, if the received power is power other than green energy, then the power supply control device 40 may be configured to not allow to receive power.

In this way, in the power control apparatus of Example 11, the selective reception and accumulation of power can be easily performed depending on identification information of the power packet structure.

Example 12

Figure 6:
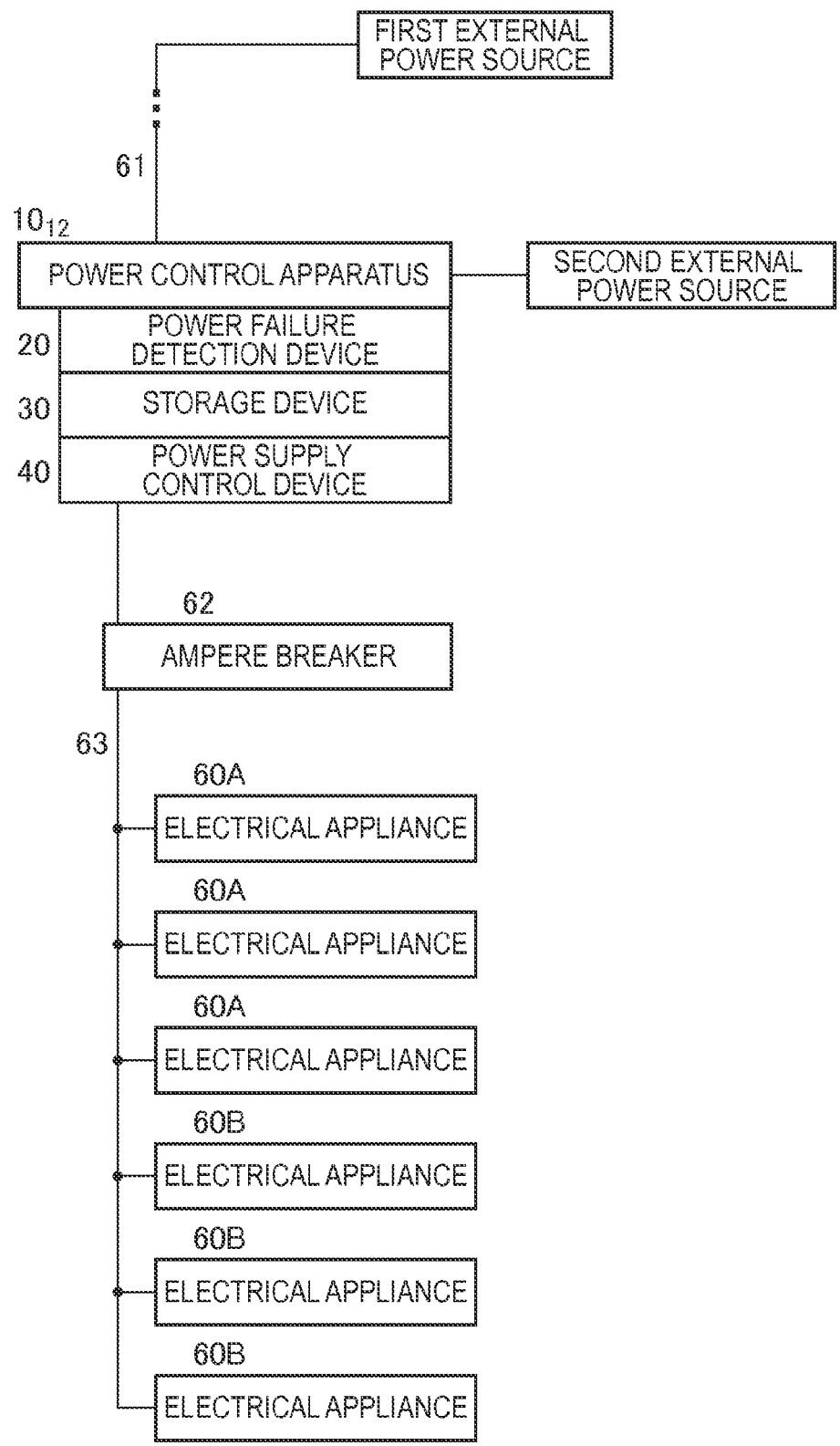
FIG. 6 is a conceptual diagram illustrating a power control apparatus and electrical appliances according to Example 12.

Example 12 relates to a power control apparatus according to the second embodiment of the present disclosure. FIG. 6 is a conceptual diagram illustrating the power control apparatus and electrical appliances of Example 12. The power control apparatus $10_{12}$ of Example 12 is a power control apparatus which supplies power from the first and second external power sources to the plurality of electrical appliances 60. The power control apparatus 10$_{12}$ includes the power failure detection device 20, the storage device 30, and the power supply control device 40. The power failure detection device 20 detects an interruption of the power supply from the first external power source and measures the power supply interruption duration. The storage device 30 stores the power supply information regarding the power supply from the second external power source to the electrical appliances 60. The power supply control device 40 controls the power supply from the second external power source to the electrical appliances 60 based on the power supply information stored in the storage device 30 when the power supply interruption duration measured by the power failure detection device 20 is in excess of a predetermined time period. In addition, if the phrase "first external power source" is replaced with "external power source" and the phrase "second external power source" is replace with "private power supply equipment", the power control apparatus of Example 12 is substantially the same as those of Examples 1 to 11 in terms of configuration and structure, and thus detailed description thereof will be omitted.

The power supply control method of Example 12 is a method of controlling power supply from an external power source and a private power supply equipment to a plurality of electrical appliances. The method includes measuring a power supply interruption duration after detecting an interruption of the power supply from a first external power source. The method also includes controlling the power supply from a second external power source to the electrical appliances based on power supply information regarding the power supply from the second external power source to the electrical appliances when the power supply interruption duration measured by the power failure detection device is in excess of a predetermined time period. In addition, the power supply control program of Example 12 is a power supply control program for controlling power supply from the first and second external power sources to a plurality of electrical appliances. A power supply interruption duration is measured after detecting an interruption of the power supply from a first external power source. When the power supply interruption duration measured by the power failure detection device is in excess of a predetermined time period, the power supply from a second external power source to the electrical appliances is controlled based on power supply information regarding the power supply from the second external power source to the electrical appliances.

Moreover, in order to distinguish power from the first external power source and power from the second external power source, in a similar manner as described in Example 11, the power (power packet structure) supplied to the electrical appliances 60 may be composed of the header portion 81 and the payload 82, and power generation source information (information which is power from the first external power source, or information which is power from the second external power source) may be stored in the header portion 81 as identification information.

The preferred examples of the present have been described, but the present disclosure is not limited to the examples. The configuration and structure of the power control apparatus, the power failure detection device, the storage device, the power supply control device according to the above-described examples are only illustrative, but can be modified appropriately. Various devices included in the power control apparatus may be configured to be integrated to the power control apparatus, or each device may be configured as a separate device, for example, each device may be connected to each other using a communication means or a signal transmission means. In the examples, it has been described based on an example in which the power control apparatus is disposed between the low-tension power distribution line and the ampere breaker or switchboard. However, the power control apparatus may be disposed between the ampere breaker or switchboard and the electrical appliance. In this case, the power supply from the private power supply equipment to the electrical appliance can be controlled by not only stopping power supply from an external power source but also cutting off electric power in the ampere breaker or switchboard. In addition, in the examples, the private power supply equipment is composed of a storage battery. However, the present disclosure is not limited thereto, and the private power supply equipment can be in the form of including a solar photovoltaic power generation device, a solar thermal power generation device, a photovoltaic and solar thermal power generation device, fuel cells, a wind power generation device, a biomass power generation device, or a waste power generation device. Alternatively, the private power supply equipment can include a combination of storage batteries and photovoltaic power generation devices, a combination of storage batteries and solar thermal power generation devices, a combination of storage batteries, photovoltaic power generation devices, and solar thermal power generation devices, a combination of storage batteries and fuel cells, a combination of storage batteries and wind power generation devices, a combination of storage batteries and biomass power generation devices, or a combination of storage batteries and waste power generation devices. Alternatively, the private power supply equipment may be a private power generation device.

The power supply control device may be in the form of storing a plurality of predetermined time periods. Specifically, the power supply control device 40 may be in the form of storing a plurality of predetermined time periods according to season, namely, for example, it may be in the form of storing a predetermined time period which is different between a summer time and a winter time. In addition, the power supply control device 40 may be in the form of storing a plurality of predetermined time periods according to time zone, namely, it may be in the form of storing a predetermined time period which is different between the morning, day, and night. The predetermined time periods may be automatically changed by the power supply control device according to season and/or time zone. The change in the predetermined time periods may be performed by a user of the electrical appliance.

Additionally, the present technology may also be configured as below.

(1) A power control apparatus for supplying power from an external power source or power from private power supply equipment to a plurality of electrical appliances, the power control apparatus including:

a power failure detection device for detecting an interruption of power supply from the external power source and for measuring a power supply interruption duration;

a storage device for storing power supply information regarding power supply from the private power supply equipment to the electrical appliances; and a power supply control device for controlling the power supply from the private power supply equipment to the electrical appliances based on the power supply information stored in the storage device when the power supply interruption duration measured by the power failure detection device is in excess of a predetermined time period.

(2) The power control apparatus according to (1), wherein the power supply from the external power source is switched into the power supply from the private power supply equipment based on detection of the interruption of the power supply from the external power source by the power failure detection device.

(3) The power control apparatus according to (1) or (2), wherein the power supply information includes information regarding an electrical appliance to which power from the private power supply equipment is not supplied when the interruption of the power supply from the external power source is detected by the power failure detection device, and wherein the power supply control device controls power supply to the electrical appliance based on the power supply information when the interruption of the power supply from the external power source is detected by the power failure detection device.

(4) The power control apparatus according to any one of (1) to (3), further including:

an available power supply amount measuring device for measuring an available power supply amount which can be supplied from the private power supply equipment, and wherein the power supply information includes information regarding a priority of electrical appliances to which power from the private power supply equipment is not supplied when the interruption of the power supply from the external power source is detected by the power failure detection device, and wherein the power supply control device controls power supply to the electrical appliances based on the power supply information and the available power supply amount measured by the available power supply amount measuring device when the interruption of the power supply from the external power source is detected by the power failure detection device.

(5) The power control apparatus according to any one of (1) to (4), further including:

an available power supply amount measuring device for measuring an available power supply amount which can be supplied from the private power supply equipment, and wherein the power supply information includes information regarding a priority of electrical appliances in which the power supply from the private power supply equipment is to be reduced when the interruption of the power supply from the external power source is detected by the power failure detection device, and wherein the power supply control device controls power supply to the electrical appliances based on the power supply information and the available power supply amount measured by the available power supply amount measuring device when the interruption of the power supply from the external power source is detected by the power failure detection device.

(6) The power control apparatus according to (5), wherein the power supply to the electrical appliance is controlled in a mode selected from a group including limitation on an amount of power usage in the electrical appliance, or transition to power saving mode of the electrical appliance, transition to energy saving mode of the electrical appliance, transition to standby mode of the electrical appliance, transition to idle mode of the electrical appliance, transition to waiting mode of the electrical appliance, transition to low-power operation mode of the electrical appliance, and transition to sleep mode of the electrical appliance.

(7) The power control apparatus according to any one of (1) to (6), wherein the power supply information includes information regarding the electrical appliance in which the power supply from the private power supply equipment is to be continued even when the power supply interruption duration measured by the power failure detection device is in excess of the predetermined time period.

(8) The power control apparatus according to any one of (1) to (7), wherein the power supply information includes information regarding the electrical appliance in which the power supply from the private power supply equipment is to be stopped when the power supply interruption duration measured by the power failure detection device is in excess of the predetermined time period, and wherein the power supply control device stops power supply to the electrical appliance based on the power supply information when the power supply interruption duration is in excess of the predetermined time period.

(9) The power control apparatus according to any one of (1) to (7), wherein the power supply information includes information regarding a priority of the electrical appliances in which the power supply from the private power supply equipment is to be stopped when the power supply interruption duration measured by the power failure detection device is in excess of the predetermined time period, and wherein the power supply control device stops power supply to the electrical appliances in a sequential manner based on the power supply information when the power supply interruption duration is in excess of the predetermined time period.

(10) The power control apparatus according to any one of (1) to (9), wherein the power supply information includes information regarding the electrical appliance in which power is to be supplied with reducing an amount of the power supply from the private power supply equipment when the power supply interruption duration measured by the power failure detection device is in excess of the predetermined time period, and wherein the power supply control device reduces the amount of power supply to the electrical appliance based on the power supply information when the power supply interruption duration is in excess of the predetermined time period.

(11) The power control apparatus according to (10), wherein the reduction in the amount of power supply is performed in a mode selected from a group including limitation on an amount of power usage in the electrical appliance, or transition to power saving mode of the electrical appliance, transition to energy saving mode of the electrical appliance, transition to standby mode of the electrical appliance, transition to idle mode of the electrical appliance, transition to waiting mode of the electrical appliance, transition to low-power operation mode of the electrical appliance, and transition to sleep mode of the electrical appliance.

(12) The power control apparatus according to any one of (1) to (11), wherein the power supply control device stores a plurality of predetermined time periods.

(13) The power control apparatus according to (12), wherein the power supply control device stores the plurality of predetermined time periods including at least one of a predetermined time period according to season and a predetermined time period according to time zone.

(14) The power control apparatus according to any one of (1) to (13), wherein the private power supply equipment is configured to include a storage battery.

(15) The power control apparatus according to any one of (1) to (13), wherein the private power supply equipment includes a photovoltaic power generation device, a solar thermal power generation device, a photovoltaic and solar thermal power generation device, fuel cells, or a wind power generation device.

(16) A power control apparatus for supplying power from a first external power source or power from a second external power source to a plurality of electrical appliances, the power control apparatus including:

a power failure detection device for detecting an interruption of power supply from the first external power source and for measuring a power supply interruption duration;

a storage device for storing power supply information regarding power supply from the second external power source to the electrical appliances; and a power supply control device for controlling the power supply from the second external power source to the electrical appliances based on the power supply information stored in the storage device when the power supply interruption duration measured by the power failure detection device is in excess of a predetermined time period.

(17) A power supply control method of controlling power supply from an external power source or power supply from private power supply equipment to a plurality of electrical appliances, the method including:

measuring a power supply interruption duration after detecting an interruption of the power supply from the external power source; and controlling the power supply from the private power supply equipment to the electrical appliances based on power supply information regarding the power supply from the private power supply equipment to the electrical appliances when the power supply interruption duration is in excess of a predetermined time period.

(18) A power supply control method of controlling power supply from a first external power source or power supply from a second external power source to a plurality of electrical appliances, the method including:

measuring a power supply interruption duration after detecting an interruption of the power supply from the first external power source; and controlling the power supply from the second external power source to the electrical appliances based on power supply information regarding the power supply from the second external power source to the electrical appliances when the power supply interruption duration measured by a power failure detection device is in excess of a predetermined time period.

(19) A power supply control program for controlling power supply from an external power source or power supply from private power supply equipment to a plurality of electrical appliances, the program performs an operation including:

measuring a power supply interruption duration after detecting an interruption of the power supply from the external power source; and controlling the power supply from the private power supply equipment to the electrical appliances based on power supply information regarding the power supply from the private power supply equipment to the electrical appliances when the power supply interruption duration is in excess of a predetermined time period.

(20) A power supply control program for controlling power supply from a first external power source or power supply from a second power source to a plurality of electrical appliances, the program performs an operation including:

measuring a power supply interruption duration after detecting an interruption of the power supply from the first external power source; and controlling the power supply from the second external power source to the electrical appliances based on power supply information regarding the power supply from the second external power source to the electrical appliances when the power supply interruption duration measured by a power failure detection device is in excess of a predetermined time period.

The present disclosure contains subject matter related to that disclosed in Japanese Priority Patent Application JP 2012-119232 filed in the Japan Patent Office on May 25, 2012, the entire content of which is hereby incorporated by reference.

What is claimed is:

1. A power control apparatus for supplying power from an external power source or power from private power supply equipment to a plurality of electrical appliances, the power control apparatus comprising:

a power failure detection device for detecting an interruption of power supply from the external power source and for measuring a power supply interruption duration;

a storage device for storing power supply information regarding power supply from the private power supply equipment to each electrical appliance of the plurality of electrical appliances; and a power supply control device for controlling the power supply from the private power supply equipment to selected electrical appliances of the plurality of electrical appliances based on the power supply information stored in the storage device for each electrical appliance when the power supply interruption duration measured by the power failure detection device is in excess of a predetermined time period, wherein the selected electrical appliances are dynamically selected based on comparison of a predetermined ratio threshold indicated by the power supply information for each electrical appliance and a measured ratio of power consumption values of the plurality of electrical appliances and an amount of available power supply from the private power supply equipment.

2. The power control apparatus according to claim 1, wherein the power supply from the external power source is switched into the power supply from the private power supply equipment based on detection of the interruption of the power supply from the external power source by the power failure detection device.

3. The power control apparatus according to claim 1, wherein the power supply information includes information regarding an electrical appliance to which power from the private power supply equipment is not supplied when the interruption of the power supply from the external power source is detected by the power failure detection device, and wherein the power supply control device controls power supply to the electrical appliance based on the power supply information when the interruption of the power supply from the external power source is detected by the power failure detection device.

4. The power control apparatus according to claim 1, further comprising:

an available power supply amount measuring device for measuring the amount of available power supply which can be supplied from the private power supply equipment, and wherein the power supply information includes information regarding a priority of electrical appliances to which power from the private power supply equipment is not supplied when the interruption of the power supply from the external power source is detected by the power failure detection device, and wherein the power supply control device controls power supply to the electrical appliances based on the power supply information and the amount of available power supply measured by the available power supply amount measuring device when the interruption of the power supply from the external power source is detected by the power failure detection device.

5. The power control apparatus according to claim 1, further comprising:

an available power supply amount measuring device for measuring the amount of available power supply which can be supplied from the private power supply equipment, and wherein the power supply information includes information regarding a priority of electrical appliances in which the power supply from the private power supply equipment is to be reduced when the interruption of the power supply from the external power source is detected by the power failure detection device, and wherein the power supply control device controls power supply to the electrical appliances based on the power supply information and the amount of available power supply measured by the available power supply amount measuring device when the interruption of the power supply from the external power source is detected by the power failure detection device.

6. The power control apparatus according to claim 5, wherein the power supply to the electrical appliance is controlled in a mode selected from one or more of a group consisting of an amount of power usage in the electrical appliance, or transition to power saving mode of the electrical appliance, transition to energy saving mode of the electrical appliance, transition to standby mode of the electrical appliance, transition to idle mode of the electrical appliance, transition to waiting mode of the electrical appliance, transition to low-power operation mode of the electrical appliance, and transition to sleep mode of the electrical appliance.

7. The power control apparatus according to claim 1, wherein the power supply information includes information regarding the electrical appliance in which the power supply from the private power supply equipment is to be continued even when the power supply interruption duration measured by the power failure detection device is in excess of the predetermined time period.

8. The power control apparatus according to claim 1, wherein the power supply information includes information regarding the electrical appliance in which the power supply from the private power supply equipment is to be stopped when the power supply interruption duration measured by the power failure detection device is in excess of the predetermined time period, and wherein the power supply control device stops power supply to the electrical appliance based on the power supply information when the power supply interruption duration is in excess of the predetermined time period.

9. The power control apparatus according to claim 1, wherein the power supply information includes information regarding a priority of the electrical appliances in which the power supply from the private power supply equipment is to be stopped when the power supply interruption duration measured by the power failure detection device is in excess of the predetermined time period, and wherein the power supply control device stops power supply to the electrical appliances in a sequential manner based on the power supply information when the power supply interruption duration is in excess of the predetermined time period.

10. The power control apparatus according to claim 1, wherein the power supply information includes information regarding the electrical appliance in which power is to be supplied with reducing an amount of the power supply from the private power supply equipment when the power supply interruption duration measured by the power failure detection device is in excess of the predetermined time period, and wherein the power supply control device reduces the amount of power supply to the electrical appliance based on the power supply information when the power supply interruption duration is in excess of the predetermined time period.

11. The power control apparatus according to claim 10, wherein the reduction in the amount of power supply is performed in a mode selected from one or more of a group consisting of an amount of power usage in the electrical appliance, or transition to power saving mode of the electrical appliance, transition to energy saving mode of the electrical appliance, transition to standby mode of the electrical appliance, transition to idle mode of the electrical appliance, transition to waiting mode of the electrical appliance, transition to low-power operation mode of the electrical appliance, and transition to sleep mode of the electrical appliance.

12. The power control apparatus according to claim 1, wherein the power supply control device stores a plurality of predetermined time periods.

13. The power control apparatus according to claim 12, wherein the power supply control device stores the plurality of predetermined time periods including at least one of a predetermined time period according to season and a predetermined time period according to time zone.

14. The power control apparatus according to claim 1, wherein the private power supply equipment is configured to include a storage battery.

15. The power control apparatus according to claim 1, wherein the private power supply equipment includes a photovoltaic power generation device, a solar thermal power generation device, a photovoltaic and solar thermal power generation device, fuel cells, or a wind power generation device.

16. A power control apparatus for supplying power from a first external power source or power from a second external power source to a plurality of electrical appliances, the power control apparatus comprising:

a power failure detection device for detecting an interruption of power supply from the first external power source and for measuring a power supply interruption duration;

a storage device for storing power supply information regarding power supply from the second external power source to each electrical appliance of the plurality of electrical appliances; and a power supply control device for controlling the power supply from the second external power source to selected electrical appliances of the plurality of electrical appliances based on the power supply information stored in the storage device for each electrical appliance when the power supply interruption duration measured by the power failure detection device is in excess of a predetermined time period, wherein the selected electrical appliances are dynamically selected based on comparison of a predetermined ratio threshold indicated by the power supply information for each electrical appliance and a measured ratio of power consumption values of the plurality of electrical appliances and an amount of available power supply from the second external power source.

17. A power supply control method of controlling power supply from an external power source or power supply from private power supply equipment to a plurality of electrical appliances, the method comprising:

measuring a power supply interruption duration after detecting an interruption of the power supply from the external power source; and controlling the power supply from the private power supply equipment to selected electrical appliances of the plurality of electrical appliances based on power supply information regarding the power supply from the private power supply equipment to each electrical appliance of the plurality of electrical appliances when the power supply interruption duration is in excess of a predetermined time period, wherein the selected electrical appliances are dynamically selected based on comparison of a predetermined ratio threshold indicated by the power supply information for each electrical appliance and a measured ratio of power consumption values of the plurality of electrical appliances and an amount of available power supply from the private power supply equipment.

18. A power supply control method of controlling power supply from a first external power source or power supply from a second external power source to a plurality of electrical appliances, the method comprising:

measuring a power supply interruption duration after detecting an interruption of the power supply from the first external power source; and controlling the power supply from the second external power source to selected electrical appliances of the plurality of electrical appliances based on power supply information regarding the power supply from the second external power source to each electrical appliance of the plurality of electrical appliances when the power supply interruption duration measured by a power failure detection device is in excess of a predetermined time period, wherein the selected electrical appliances are dynamically selected based on comparison of a predetermined ratio threshold indicated by the power supply information for each electrical appliance and a measured ratio of power consumption values of the plurality of electrical appliances and an amount of available power supply from the second external power source.

19. A non-transitory computer-readable storage medium having embodied thereon a power supply control program for controlling power supply from an external power source or power supply from private power supply equipment to a plurality of electrical appliances, wherein when the program is executed by a computer, the program causes the computer to execute a method, the method comprising:

measuring a power supply interruption duration after detecting an interruption of the power supply from the external power source; and controlling the power supply from the private power supply equipment to selected electrical appliances of the plurality of electrical appliances based on power supply information regarding the power supply from the private power supply equipment to each electrical appliance of the plurality of electrical appliances when the power supply interruption duration is in excess of a predetermined time period, wherein the selected electrical appliances are dynamically selected based on comparison of a predetermined ratio threshold indicated by the power supply information for each electrical appliance and a measured ratio of power consumption values of the plurality of electrical appliances and an amount of available power supply from the private power supply equipment.

20. A non-transitory computer-readable storage medium having embodied thereon a power supply control program for controlling power supply from a first external power source or power supply from a second external power source to a plurality of electrical appliances, wherein when the program is executed by a computer, the program causes the computer to execute a method, the method comprising performs an operation including:

measuring a power supply interruption duration after detecting an interruption of the power supply from the first external power source; and controlling the power supply from the second external power source to selected electrical appliances of the plurality of electrical appliances based on power supply information regarding the power supply from the second external power source to each electrical appliance of the plurality of electrical appliances when the power supply interruption duration measured by a power failure detection device is in excess of a predetermined time period, wherein the selected electrical appliances are dynamically selected based on comparison of a predetermined ratio threshold indicated by the power supply information for each electrical appliance and a measured ratio of power consumption values of the electrical appliances and an amount of available power supply from the second external power source.

* * * * *